United States Patent
Visvesha et al.

(10) Patent No.: US 12,095,920 B2
(45) Date of Patent: Sep. 17, 2024

(54) OFFLINE AUTHENTICATION OF BATTERIES

(71) Applicant: OLA ELECTRIC MOBILITY LIMITED, Bengaluru (IN)

(72) Inventors: Jeevan Visvesha, Bengaluru (IN); Sathya Narayanan Nagarajan, Bengaluru (IN)

(73) Assignee: OLA ELECTRIC MOBILITY LIMITED, Bengaluru (IN)

( * ) Notice: Subject to any disclaimer, the term of this patent is extended or adjusted under 35 U.S.C. 154(b) by 521 days.

(21) Appl. No.: 17/185,607

(22) Filed: Feb. 25, 2021

(65) Prior Publication Data
US 2021/0377030 A1    Dec. 2, 2021

(30) Foreign Application Priority Data
Jun. 1, 2020   (IN) .............................. 202041022977

(51) Int. Cl.
*H04L 9/32* (2006.01)
*H01M 10/48* (2006.01)
*H04L 12/40* (2006.01)

(52) U.S. Cl.
CPC .......... *H04L 9/3228* (2013.01); *H01M 10/48* (2013.01); *H04L 12/40* (2013.01); *H01M 2220/20* (2013.01); *H04L 2012/40215* (2013.01); *H04L 2012/40273* (2013.01); *H04L 2209/84* (2013.01)

(58) Field of Classification Search
CPC ...... H04L 2012/40215; H01M 2220/20; Y02T 90/16; Y02T 10/70
See application file for complete search history.

(56) References Cited

U.S. PATENT DOCUMENTS

| | | | |
|---|---|---|---|
| 7,863,858 B2 | 1/2011 | Gangstoe et al. | |
| 8,290,649 B2 * | 10/2012 | Iwashita | B60L 53/14 701/22 |
| 8,536,826 B2 * | 9/2013 | Matsuoka | B60L 53/65 702/187 |

(Continued)

FOREIGN PATENT DOCUMENTS

| | | |
|---|---|---|
| CN | 108544932 A | 9/2018 |
| EP | 3476647 A4 | 3/2020 |

*Primary Examiner* — Ellen Tran
(74) *Attorney, Agent, or Firm* — CHIP Law Group

(57) ABSTRACT

An offline authentication of batteries includes communicating an encrypted authentication request to secondary batteries and a vehicle controller by a primary battery of an electric vehicle. The encrypted authentication request is decrypted to obtain a first random number and a fleet flag. An encrypted authentication response, including a first random number, a second random number, and a vehicle identifier, is communicated to each battery. Each battery verifies the first random number and the vehicle identifier. An encrypted battery status, including the first and second random numbers and an authentication status, is communicated to the primary battery that verifies the first and second random number and the authentication status. The primary battery communicates an encrypted authentication message to the secondary batteries and the vehicle controller. The secondary batteries and the vehicle controller verify the first and second random numbers and the authentication status for authenticating each battery.

15 Claims, 12 Drawing Sheets

(56) References Cited

U.S. PATENT DOCUMENTS

| | | | |
|---|---|---|---|
| 8,760,112 B2* | 6/2014 | Kuroiwa | B60L 53/66 |
| | | | 320/109 |
| 9,637,003 B2* | 5/2017 | Léonard | H02J 7/0029 |
| 10,229,552 B2* | 3/2019 | Holtappels | H01M 10/4207 |
| 2010/0010698 A1* | 1/2010 | Iwashita | B60L 53/665 |
| | | | 340/5.2 |
| 2011/0066309 A1* | 3/2011 | Matsuoka | B60L 50/64 |
| | | | 702/187 |
| 2012/0049786 A1* | 3/2012 | Kurimoto | H01M 10/4221 |
| | | | 320/106 |
| 2012/0049787 A1* | 3/2012 | Kuroiwa | H02J 7/04 |
| | | | 320/106 |
| 2014/0365065 A1* | 12/2014 | Leonard | B60L 58/10 |
| | | | 701/29.6 |
| 2016/0232736 A1* | 8/2016 | Holtappels | H01M 50/514 |

* cited by examiner

OFFLINE AUTHENTICATION OF BATTERIES

CROSS-RELATED APPLICATIONS

This application claims priority of Indian Non-Provisional Application No. 202041022977, filed Jun. 1, 2020, the contents of which are incorporated herein by reference.

FIELD

Various embodiments of the disclosure relate generally to battery authentication. More specifically, various embodiments of the disclosure relate to offline authentication of batteries of an electric vehicle.

BACKGROUND

In the present era, travelling has become a day-to-day requirement. A person may be required to travel for various reasons such as work, vacation, education, or the like. For such travelling, the person may use various modes of transport such as a two-wheeler vehicle, a three-wheeler vehicle, a four-wheeler vehicle, or the like. These vehicles may be fuel-based vehicles that require fossil fuel (for example, petrol or diesel) to power their engines. However, the fossil fuel is scarcely available in nature and needs to be conserved. Further, burning of the fossil fuel by the fossil fuel-based vehicles causes environmental pollution that leads to global warming and many health hazards. Also, due to humongous demand, the fossil fuel may become more and more expensive and may not be affordable by the person. Furthermore, the efficiency of the fossil fuel-based vehicles is poor.

Nowadays, the fossil fuel-based vehicles are being replaced by electric vehicles that use one or more electric motors or traction motors for propulsion. An electric vehicle may be powered through a collector system by electricity from off-vehicle sources or may be self-contained with one or more batteries. When an electric vehicle operates using charged batteries, energy is lost during the process of converting the electrical energy to the mechanical energy, and hence the charged batteries discharge as per the usage. The discharged batteries of the electric vehicle are either charged periodically or swapped with charged batteries for its functioning. However, swapping of the discharged batteries with the charged batteries poses some risks that may lead to security concerns. Such security concerns may include stealing of batteries, use of fake batteries, unauthorized swapping of batteries, or the like.

In light of the above concerns, the one or more batteries of the electric vehicle are required to be authenticated prior to their use in the electric vehicle. Presently, such authentication is performed by way of a server arrangement that authenticates the one or more batteries of the electric vehicle. However, when a connectivity to the server arrangement is lost, the authentication of the one or more batteries may be disrupted. Furthermore, during such online authentication, sensitive information associated with the electric vehicle, the one or more batteries, and the driver may be exposed to a third-party via an unsecured network. An intruder may carry a sniffing attack for obtaining the sensitive information. The sensitive information may later be used by the intruder to carry a replay attack that may lead to various security concerns (such as misuse and theft) associated with the electric vehicle, the one or more batteries, and the driver.

The aforementioned security concerns not only leads to emotional despair but also cause financial loss to an owner or the driver of the electric vehicle. Furthermore, other parties such as a vendor and a supplier of the one or more batteries also suffer financial loss caused due to cost, time and effort spent in inquiry, reimbursement, and replacement of the one or more batteries in the electric vehicle.

In light of the foregoing, there exists a need for a technical and reliable solution that overcomes the above-mentioned problems, challenges, and short-comings, and continues to facilitate a secured authentication of one or more batteries of an electric vehicle in a manner that prevents stealing and misuse of the one or more batteries.

SUMMARY

Offline authentication of batteries of an electric vehicle is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
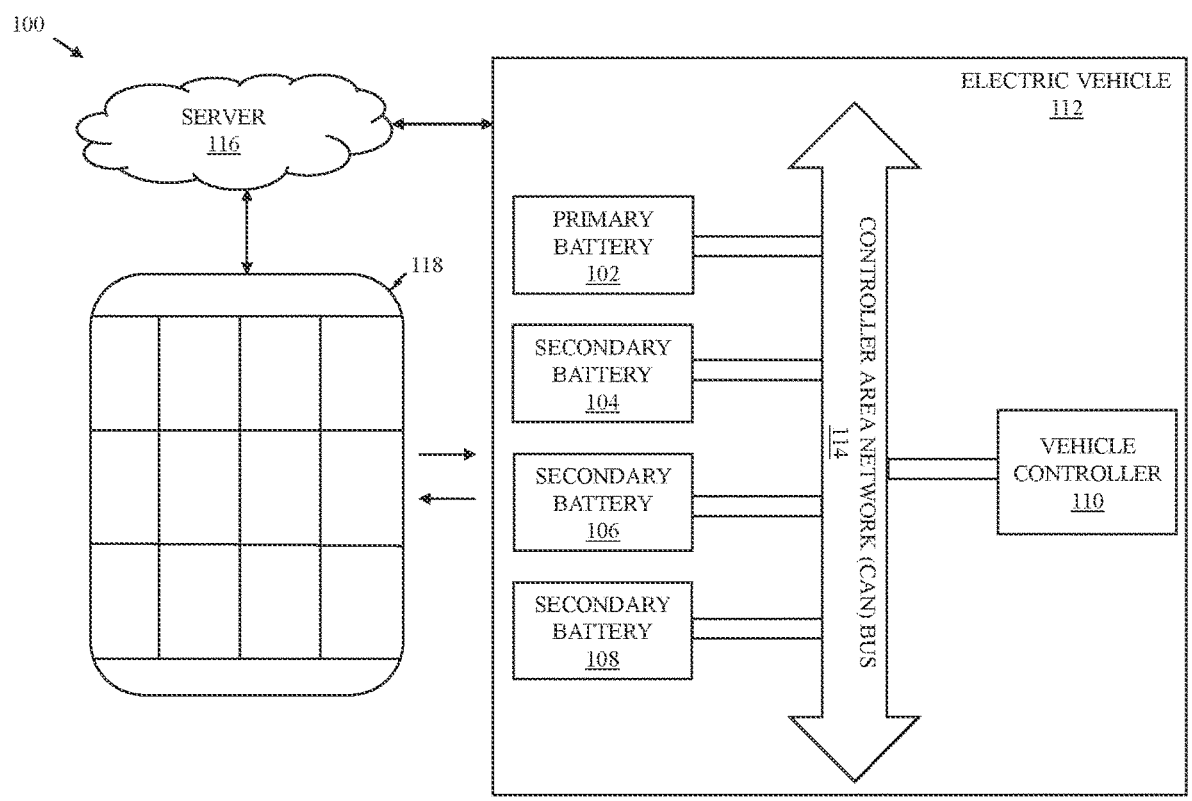
FIG. 1 is a block diagram that illustrates a system environment for offline battery authentication, in accordance with an exemplary embodiment of the disclosure.

Certain embodiments of the disclosure may be found in a disclosed apparatus for performing an offline authentication of one or more batteries of an electric vehicle. Exemplary aspects of the disclosure provide an offline battery authentication method and system for performing the offline authentication of the one or more batteries of the electric vehicle. The method includes one or more operations that are executed by circuitry of the one or more batteries and a vehicle controller of the electric vehicle to perform the offline authentication of the one or more batteries. The one or more batteries may include at least a primary battery and one or more secondary batteries of the electric vehicle. In an exemplary embodiment, the primary battery may be configured to generate a first random number. The primary battery may be further configured to communicate an encrypted authentication request to the one or more secondary batteries and the vehicle controller via a controller area network (CAN) bus of the electric vehicle. In an embodiment, the encrypted authentication request may include the first random number and a fleet flag. The fleet flag may be determined based on a category of the electric vehicle. The category of the electric vehicle may correspond to at least one of an electric vehicle associated with an individual, a fleet of electric vehicles associated with an entity, or a fleet of electric vehicles associated with the individual. In an embodiment, the encrypted authentication request may further include a request identifier. The request identifier may be a unique identification number that identifies a corresponding authentication request communicated by the primary battery.

In an embodiment, the one or more secondary batteries and the vehicle controller may be configured to receive the encrypted authentication request from the primary battery and decrypt the encrypted authentication request to obtain at least the first random number and the fleet flag. Each of the one or more secondary batteries and the vehicle controller, upon decrypting the encrypted authentication request, may be further configured to store at least the first random number. In an embodiment, the vehicle controller may be further configured to generate a second random number. In an embodiment, the vehicle controller may be further configured to communicate an encrypted authentication response to each battery (such as the primary battery and the one or more secondary batteries) of the electric vehicle via the CAN bus. The encrypted authentication response may include at least the first random number, the second random number, and a vehicle identifier associated with the fleet flag.

In an embodiment, each battery may be further configured to receive the encrypted authentication response from the vehicle controller and decrypt the encrypted authentication response. Each battery may be further configured to verify, upon decrypting the encrypted authentication response, the first random number and the vehicle identifier. In an embodiment, each of the one or more secondary batteries may be further configured to communicate an encrypted battery status to the primary battery via the CAN bus. In an embodiment, the encrypted battery status may include at least the first random number, the second random number, and an authentication status. The authentication status may be determined based on verification of the first random number and the vehicle identifier by each of the one or more secondary batteries. In an embodiment, the encrypted battery status of each secondary battery may further include a secondary battery identifier. The secondary battery identifier may be a unique identification number that identifies a corresponding secondary battery in the electric vehicle.

In an embodiment, the primary battery may be further configured to receive the encrypted battery status from each secondary battery and decrypt the encrypted battery status of each secondary battery. The primary battery may be further configured to verify, upon decrypting the encrypted battery status of each of the one or more secondary batteries, at least the first random number, the second random number, and the authentication status. Further, in an embodiment, the primary battery may be configured to communicate an encrypted authentication message to the one or more secondary batteries and the vehicle controller via the CAN bus. The encrypted authentication message may include at least the first random number, the second random number, and the authentication status. The encrypted authentication message may further include a primary battery identifier of the primary battery. The primary battery identifier is a unique identification number that identifies the primary battery in the electric vehicle.

In an embodiment, the one or more secondary batteries and the vehicle controller may be further configured to receive the encrypted authentication message from the primary battery and decrypt the encrypted authentication message. The one or more secondary batteries and the vehicle controller may be further configured to verify, upon decrypting the encrypted authentication message, at least the first random number, the second random number, and the authentication status for authenticating each battery.

In an embodiment, the vehicle controller may be further configured to communicate an encrypted authentication message response to each battery via the CAN bus. The encrypted authentication message response may include the first random number, the second random number, and a vehicle controller identifier. Each battery may be further configured to receive the encrypted authentication message response from the vehicle controller and decrypt the encrypted authentication message response. Each battery may be further configured to verify, upon decrypting the encrypted authentication message response, at least the first random number and the second random number included in the encrypted authentication message response. Subsequently, each battery may be further configured to store, upon successful verification of the first random number and the second random number, the vehicle controller identifier.

Thus, various methods and systems of the disclosure provide offline authentication of one or more batteries of an electric vehicle. The disclosed methods and systems allow for the offline authentication of the one or more batteries that prevents the electric vehicle from getting stranded in case of connectivity failure. The disclosed methods and systems create a secure offline parallel authentication mechanism that avoids server dependency as it is complete offline based. The offline parallel authentication mechanism helps in stopping any sniffing attack on a CAN bus of the electric vehicle as these are encrypted payload. The offline parallel authentication mechanism helps in stopping any spoofing attack and replay attack as it works on a dynamic random number during every ignition cycle i.e., when an electric engine of the electric vehicle is ready to be powered by the one or more batteries of the electric vehicle. The offline parallel authentication mechanism helps in performing parallel authentication of 'N' number of batteries thereby completely optimizing time for security checks. Here, 'N' corresponds to an integer that is greater than or equal to '1' (i.e., N>=1).

FIG. 1 is a block diagram that illustrates a system environment 100 for offline battery authentication, in accordance with an exemplary embodiment of the disclosure. The system environment 100 includes a primary battery 102, one or more secondary batteries (such as secondary batteries 104, 106, and 108), and a vehicle controller 110 of an electric vehicle 112. The primary battery 102, the secondary batteries 104, 106, and 108, and the vehicle controller 110 communicate with each other via a controller area network (CAN) bus 114. The system environment 100 further includes an application server 116 and a battery charger 118 that are communicatively coupled to each other via a communication network (not shown). Examples of the communication network may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities (such as the electric vehicle 112, the application server 116, and the battery charger 118) in the system environment 100 may be coupled to the communication network in accordance with various wired and wireless communication protocols, such as Transmission Control Protocol and Internet Protocol (TCP/IP), User Datagram Protocol (UDP), Long Term Evolution (LTE) communication protocols, or any combination thereof.

A battery (such as the primary battery 102 or the secondary battery 104, 106, or 108) is a device that consists of one or more electrochemical cells with external connections to one or more electric motors (such as traction motors, universal motors, induction motors, or the like) of the electric vehicle 112 for propulsion. When the battery is supplying electrical energy, its positive terminal is referred to as a cathode and its negative terminal is referred to as an anode. The terminal marked as negative is a source of electrons that may flow through an external electric circuit to the positive terminal. When the battery is connected to an external electric load, a redox reaction converts high-energy reactants to lower-energy products, and the free-energy difference is delivered to the external circuit as the electrical energy. During the propulsion of the electric vehicle 112, this electrical energy is converted into mechanical energy by using an electric engine (i.e., one or more electric motors such as DC brushless motors, AC induction motors, permanent magnet motors, or the like) of the electric vehicle 112. In an exemplary embodiment, the battery may correspond to a rechargeable battery, a swappable battery, or a swappable and replaceable battery. Further, each battery may include one or more battery packs including one or more cells. Examples of the battery may include, but are not limited to, a lead acid battery, a Nickel Cadmium (NiCd) battery, a Nickel Metal Hydride (NIMH) battery, a lithium ion battery, a zinc air battery, or the like.

The primary battery 102 may include suitable logic, circuitry, interfaces, and/or code, executable by the circuitry, that may be configured to power the electric vehicle 112 and perform one or more operations associated with the offline battery authentication. Hereinafter, the terms "battery authentication," "offline battery authentication," "offline authentication," and "authentication" may be interchangeably used. In an embodiment, the primary battery 102 may be required to be authenticated prior to its use for powering the electric vehicle 112. In an embodiment, the offline authentication of the primary battery 102 may be performed after a wakeup sequence of the electric engine of the electric vehicle 112. The wakeup sequence of the electric engine may be performed by powering the electric engine by using electric current from the one or more batteries of the electric vehicle 112. In another embodiment, the offline authentication of the primary battery 102 may be performed periodically. The period for performing the offline authentication may be based on predefined settings or real time settings provided by a user. In another embodiment, the offline authentication of the primary battery 102 may be performed in parallel with the secondary batteries 104, 106, and 108. The primary battery 102 may be communicatively coupled to the secondary batteries 104, 106, and 108 and the vehicle controller 110 via the CAN bus 114 of the electric vehicle 112.

In an embodiment, the primary battery 102 may be configured to store data (such as battery identifier (ID), health data (that indicates a state of health relative to its ideal condition), charging level data (that indicates a level of charge relative to its ideal capacity), historical authentication data, or the like) associated with the primary battery 102. In an embodiment, the primary battery 102 may be further configured to store data (such as battery IDs, health data (that indicates a state of health relative to its ideal condition), charging level data (that indicates a level of charge relative to its ideal capacity), historical authentication data, or the like) associated with each of the secondary batteries 104, 106, and 108. In an embodiment, the primary battery 102 may be further configured to communicate with the secondary batteries 104, 106, and 108 and the vehicle controller 110 for performing data communication and data verification for executing the authentication of each battery. For example, the primary battery 102 may be configured to generate a first random number. The primary battery 102 may be further configured to communicate an encrypted authentication request to the secondary batteries 104, 106, and 108 and the vehicle controller 110 of the electric vehicle 112 via the CAN bus 114. The encrypted authentication request may include at least the first random number and a fleet flag. The primary battery 102 may be further configured to receive an encrypted authentication response from the vehicle controller 110 via the CAN bus 114. The encrypted authentication response may include at least the first random number, a second random number, and a vehicle identifier associated with the fleet flag. The primary battery 102 may be further configured to decrypt the encrypted authentication response and verify the first random number and the vehicle identifier. The primary battery 102 may be further configured to receive an encrypted battery status from each of the secondary batteries 104, 106, and 108 via the CAN bus 114. The encrypted battery status includes at least the first random number, the second random number, and an authentication status associated with each of the secondary batteries 104, 106, and 108. The primary battery 102 may be further configured to decrypt the encrypted battery status of each of the secondary batteries 104, 106, and 108 and verify at least the first random number, the second random number, and the authentication status. The primary battery 102 may be further configured to communicate an encrypted authentication message including at least the authentication status, the first random number, and the second random number to the secondary batteries 104, 106, and 108 and the vehicle controller 110. The primary battery 102 may be further configured to receive an encrypted authentication message response from the vehicle controller 110 via the CAN bus 114. The encrypted authentication message response may include at least the first random number, the second random number, and a vehicle controller identifier. The primary battery 102 may be further configured to decrypt the encrypted authentication message response and verify at least the first random number and the second random number. Upon successful verification of the first random number and the second random number, the primary battery 102 may be further configured to store the vehicle controller identifier.

The secondary battery 104, 106, or 108 may include suitable logic, circuitry, interfaces, and/or code, executable by the circuitry, that may be configured to power the electric vehicle 112 and perform one or more operations associated with the offline battery authentication. In an embodiment, the secondary batteries 104, 106, and 108 may be required to be authenticated prior to its use for powering the electric vehicle 112. In an embodiment, the offline authentication of each of the secondary batteries 104, 106, and 108 may be performed after the wakeup sequence of the electric engine of the electric vehicle 112. The wakeup sequence of the electric engine may be performed by powering the electric engine by using electric current from the one or more batteries of the electric vehicle 112 In another embodiment, the offline authentication of each of the secondary batteries 104, 106, and 108 may be performed periodically. The period for performing the offline authentication may be based on predefined settings or real time settings provided by a user. In another embodiment, the offline authentication of each of the secondary batteries 104, 106, and 108 may be performed in parallel with the primary battery 102. The secondary battery 104, 106, or 108 may be communicatively coupled to the primary battery 102 and the vehicle controller 110 via the CAN bus 114 of the electric vehicle 112.

In an embodiment, each secondary battery (such as the secondary battery 104, 106, or 108) may be configured to receive the encrypted authentication request from the primary battery 102 via the CAN bus 114. Each secondary battery may be further configured to decrypt the encrypted authentication request to obtain at least the first random number and the fleet flag. Each secondary battery may be further configured to store at least the first random number after decrypting the encrypted authentication request. Each secondary battery may be further configured to receive the encrypted authentication response from the vehicle controller 110 via the CAN bus 114. Each secondary battery may be further configured to decrypt the encrypted authentication response and verify the first random number and the vehicle identifier. Each secondary battery may be further configured to communicate the encrypted battery status to the primary battery 102 via the CAN bus 114. Each secondary battery may be further configured to receive the encrypted authentication message from the primary battery 102 via the CAN bus 114. Each secondary battery may be further configured to decrypt the encrypted authentication message and verify at least the first random number, the second random number, and the authentication status for authenticating at least one of the primary battery 102 or the secondary batteries 104, 106, and 108. Each secondary battery may be further configured to receive the encrypted authentication message response from the vehicle controller 110 via the CAN bus 114. Each secondary battery may be further configured to decrypt the encrypted authentication message response and verify at least the first random number and the second random number. Upon successful verification of the first random number and the second random number, each secondary battery may be further configured to store the vehicle controller identifier.

The vehicle controller 110 may include suitable logic, circuitry, interfaces, and/or code, executable by the circuitry, that may be configured to perform one or more operations associated with the offline battery authentication. In general, the vehicle controller 110 may be configured to control one or more of electrical systems or subsystems in the electric vehicle 112. For example, the vehicle controller 110 may provide torque coordination, operation and gearshift strategies, voltage coordination, charging control, monitoring, thermal management and much more for electrified and connected powertrains of the electric vehicle 112. Further, the vehicle controller 110, also referred to as a vehicle control unit (VCU) or a motor control unit (MCU), may read sensor signals, for example, brakes, high voltage interlock loop (HVIL), or charger connection. Then, the vehicle controller 110 may act to balance the system energy, optimize torque, control one or more motors, one or more battery packs, an on-board charging system, or the like. Further, the vehicle controller 110 may facilitate powering of the electric vehicle 112 by using electrical energy from the one or more batteries such as the primary battery 102 and the secondary batteries 104, 106, and 108. Further, the vehicle controller 110 may participate in the offline battery authentication of the one or more batteries such as the primary battery 102 and the secondary batteries 104, 106, and 108.

In an embodiment, the vehicle controller 110 may be configured to receive the encrypted authentication request from the primary battery 102 via the CAN bus 114. The vehicle controller 110 may be further configured to decrypt the encrypted authentication request to obtain at least the first random number and the fleet flag. The vehicle controller 110 may be further configured to store at least the first random number after decrypting the encrypted authentication request. The vehicle controller 110 may be further configured to generate the second random number. The vehicle controller 110 may be further configured to communicate the encrypted authentication response to each battery. The encrypted authentication response may include at least the first random number, the second random number, and the vehicle identifier associated with the fleet flag. The vehicle controller 110 may be further configured to receive the encrypted authentication message including at least the authentication status, the first random number, and the second random number from the primary battery 102 via the CAN bus 114. The vehicle controller 110 may be further configured to decrypt the encrypted authentication message and verify at least the first random number, the second random number, and the authentication status for authenticating each battery. The vehicle controller 110 may be further configured to communicate the encrypted authentication message response to each battery. The encrypted authentication message response may include at least the first random number, the second random number, and the vehicle controller identifier.

The electric vehicle 112 is a mode of transportation that is utilized, by a user (such as a driver), to commute from one location to another location. The electric vehicle 112 may include suitable logic, circuitry, interfaces and/or code, executable by the circuitry, that may be configured to control and perform one or more operations with or without any driving assistance from the driver. In an embodiment, the electric vehicle 112 may be deployed by a transport service provider (e.g., a cab service provider) to cater to travelling requirements of various passengers. In another embodiment, the electric vehicle 112 may be privately owned by the user and may be used for fulfilling self-travelling requirements. The electric vehicle 112 may be a vehicle that uses one or more electric motors or traction motors for propulsion. The electric vehicle 112 may be powered through a collector system by electricity from off-vehicle sources, or may be self-contained with one or more batteries (such as the primary battery 102 and/or the secondary batteries 104, 106, and 108) that are swappable with other similar batteries as and when required. These batteries are utilized for providing necessary power (such as electrical and mechanical power) to the electric vehicle 112. Examples of the electric vehicle 112 may include, but are not limited to, an automobile, a bus, a car, an auto rickshaw, and a bike.

The CAN bus 114 may include suitable logic, circuitry, interfaces, and/or code, executable by the circuitry, that may be configured to perform one or more operations associated with data communication between various devices or components of the electric vehicle 112. The CAN bus 114 may correspond to a vehicle communication channel or network that allows various devices or components in the electric vehicle 112 to connect and communicate with each other without using any external network. The CAN bus 114 is based on a message-based protocol that facilitates exchange of data between various devices of the electric vehicle 112. In an embodiment, the CAN bus 114 may be configured to facilitate communicative coupling between the primary battery 102, the secondary batteries 104, 106, and 108, and the vehicle controller 110. In an exemplary embodiment, the CAN bus 114 may be configured to facilitate parallel communication between various devices or components of the electric vehicle 112 in an efficient and effective manner.

The application server 116 may include suitable logic, circuitry, interfaces, and/or code, executable by the circuitry, that may be configured to perform various operations associated with the management of the one or more batteries. The application server 116 may be a computing device, which may include a software framework, that may be configured to create the application implementation and perform the various operations associated with the charging, swapping, and managing of the one or more batteries. The application server 116 may be realized through various web-based technologies, such as, but are not limited to, a Java web-framework, a .NET framework, a PHP framework, a python framework, or any other web-application framework. The application server 116 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the application server 116 may include, but are not limited to, a personal computer, a laptop, or a network of computer systems.

In an embodiment, the application server 116 may be communicatively coupled to the electric vehicle 112 and the battery charger 118 over one or more communication networks. In an embodiment, the application server 116 may be configured to process, control, and manage various functionalities and operations such as battery charging, battery swapping, user authentication, battery reception, battery selection, ID assignment, battery configuration, battery release, and the like. The application server 116 may be configured to receive assignment data associated with assignment of the one or more batteries to one or more electric vehicles such as the electric vehicle 112. The data may include a vehicle identifier of the electric vehicle 112, a primary battery identifier of the primary battery 102, one or more secondary battery identifiers of the one or more secondary batteries 104, 106, and 108, a fleet flag associated with the electric vehicle 112, and a vehicle controller identifier associated with the vehicle controller 110. In some embodiments, the application server 116 may receive the data from the primary battery 102. Alternatively, the application server 116 may receive the data from each of the secondary batteries 104, 106, and 108 or the vehicle controller 110.

The battery charger 118 may include suitable logic, circuitry, interfaces, and/or code, executable by the circuitry, that may be configured to control and perform one or more operations associated with charging, swapping, and managing various batteries of various types. The battery charger 118 may include a charging and storing platform for charging one or more discharged batteries and storing one or more charged batteries. The charging platform may include one or more charging slots that are utilized to charge the one or more discharged batteries. The storing platform may include one or more storing slots that are utilized to store the one or more charged batteries. The battery charger 118 may further include a swapping platform for receiving one or more discharged batteries for swapping from a user and releasing and providing one or more charged batteries from the charging and storing platform to the user. In some embodiments, the battery charger 118 may be referred to as a battery charging station, a battery swapping station, or a battery charging and swapping station. The battery charger 118 may be communicatively coupled to the application server 116.

In an embodiment, based on selection of a given battery as the primary battery 102 by the battery charger 118, an application program interface (API) of the given battery gets activated that facilitates functioning of the primary battery 102. Furthermore, an API of each of the secondary batteries 104, 106, and 108 also gets activated to facilitate functioning of the secondary batteries 104, 106, and 108.

In operation, the primary battery 102 may be configured to generate the first random number. The primary battery 102 may be further configured to communicate the encrypted authentication request to the secondary batteries 104, 106, and 108 and the vehicle controller 110 via the CAN bus 114. In an embodiment, the encrypted authentication request may include the first random number and the fleet flag. The fleet flag may be determined based on a category of the electric vehicle 112. The category of the electric vehicle 112 may correspond to at least one of an electric vehicle associated with an individual, a fleet of electric vehicles associated with an entity, or a fleet of electric vehicles associated with an individual. In an embodiment, the encrypted authentication request may further include a request identifier. The request identifier may be a unique identification number that identifies a corresponding authentication request communicated by the primary battery 102. The request identifier may be a symbol, a numerical sting, an alphabetical string, an alphanumeric string, or any combination thereof.

In an embodiment, the secondary batteries 104, 106, and 108 and the vehicle controller 110 may be configured to receive the encrypted authentication request from the primary battery 102. Further, the secondary batteries 104, 106, and 108 and the vehicle controller 110 may be configured to decrypt the encrypted authentication request to obtain at least the first random number and the fleet flag. Each of the secondary batteries 104, 106, and 108 and the vehicle controller 110, upon decrypting the encrypted authentication request, may be further configured to store at least the first random number. In an embodiment, the vehicle controller 110 may be further configured to generate the second random number. In an embodiment, the vehicle controller 110 may be further configured to communicate the encrypted authentication response to each battery (such as the primary battery 102 and the secondary batteries 104, 106, and 108) of the electric vehicle 112 via the CAN bus 114. The encrypted authentication response may include at least the first random number, the second random number, and the vehicle identifier associated with the fleet flag. The vehicle identifier may be a symbol, a numerical string, an alphabetical string, an alphanumerical string, or any combination thereof that is used to identify the electric vehicle 112.

In an embodiment, each battery (such as the primary battery 102 and the secondary batteries 104, 106, and 108) may be further configured to receive the encrypted authentication response from the vehicle controller 110. Further, each battery may be configured to decrypt the encrypted authentication response. Each battery may be further configured to verify, upon decrypting the encrypted authentication response, the first random number and the vehicle identifier. In an embodiment, each of the secondary batteries 104, 106, and 108 may be further configured to communicate the encrypted battery status to the primary battery 102 via the CAN bus 114. In an embodiment, the encrypted battery status may include at least the first random number, the second random number, and the authentication status. The authentication status may be determined based on verification of the first random number and the vehicle identifier by each of the secondary batteries 104, 106, and 108. In an embodiment, the encrypted battery status of each secondary battery (such as the secondary battery 104, 106, or 108) may further include a secondary battery identifier. The secondary battery identifier may be a unique identification number that identifies a corresponding secondary battery in the electric vehicle. The secondary battery identifier may be a symbol, a numerical string, an alphabetical string, an alphanumerical string, or any combination thereof that is used to identify the corresponding secondary battery.

In an embodiment, the primary battery 102 may be further configured to receive the encrypted battery status from each of the secondary batteries 104, 106, and 108 and decrypt the encrypted battery status of each of the secondary batteries 104, 106, and 108. The primary battery 102 may be further configured to verify, upon decrypting the encrypted battery status of each of the secondary batteries 104, 106, and 108, at least the first random number, the second random number, and the authentication status. Further, in an embodiment, the primary battery 102 may be configured to communicate the encrypted authentication message to the secondary batteries 104, 106, and 108 and the vehicle controller 110 via the CAN bus 114. The encrypted authentication message may include at least the first random number, the second random number, and the authentication status. The encrypted authentication message may further include the primary battery identifier of the primary battery 102. The primary battery identifier may be a unique identification number that identifies the primary battery 102 in the electric vehicle 112. The primary battery identifier may be a symbol, a numerical string, an alphabetical string, an alphanumerical string, or any combination thereof that is used to identify the primary battery 102.

In an embodiment, the secondary batteries 104, 106, and 108 and the vehicle controller 110 may be further configured to receive the encrypted authentication message from the primary battery 102 via the CAN bus 114 and decrypt the encrypted authentication message. The secondary batteries 104, 106, and 108 and the vehicle controller 110 may be further configured to verify, upon decrypting the encrypted authentication message, at least the first random number, the second random number, and the authentication status for authenticating each battery.

In an embodiment, the vehicle controller 110 may be further configured to communicate the encrypted authentication message response to each battery via the CAN bus 114. The encrypted authentication message response may include the first random number, the second random number, and the vehicle controller identifier. Each battery may be further configured to receive the encrypted authentication message response from the vehicle controller 110 and decrypt the encrypted authentication message response. Each battery may be further configured to verify, upon decrypting the encrypted authentication message response, at least the first random number and the second random number included in the encrypted authentication message response. Subsequently, each battery may be further configured to store, upon successful verification of the first random number and the second random number, the vehicle controller identifier. Various other functionalities and operations associated with the offline battery authentication have been described in detail in conjunction with FIGS. 2, 3, 4A-4D, 5, 6A-6B, 7, and 8.

Figure 2:
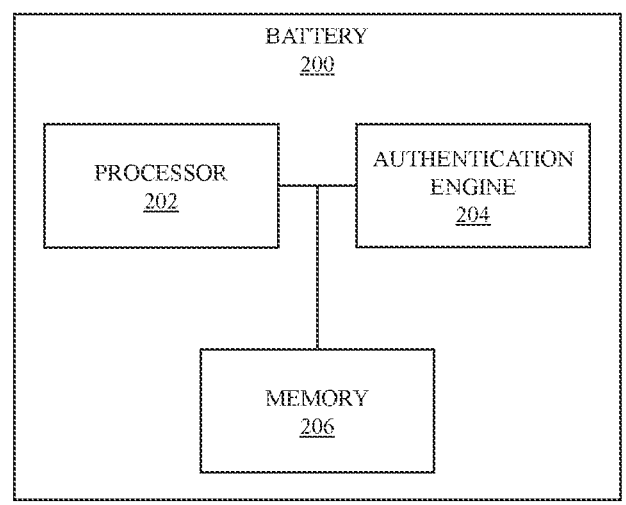
FIG. 2 is a block diagram of a battery of an electric vehicle of the system environment of FIG. 1, in accordance with an exemplary embodiment of the disclosure.

FIG. 2 is a block diagram of a battery 200 of the electric vehicle 112, in accordance with an exemplary embodiment of the disclosure. The battery 200 may correspond to one of the primary battery 102 or the secondary battery 104, 106, or 108. The battery 200 may include circuitry such as a processor 202, an authentication engine 204, and a memory 206. The battery 200 may further include one or more electrochemical cells with external connections to one or more electric motors (such as traction motors, universal motors, induction motors, or the like) of the electric vehicle 112 for propulsion. During the propulsion of the electric vehicle 112, the electrical charge stored in the battery 200 is converted into electrical energy that is further converted into mechanical energy by using the one or more electric motors of the electric vehicle 112. The battery 200 may correspond to a rechargeable battery, a swappable battery, or a swappable and replaceable battery. Further, the battery 200 may include one or more battery packs including one or more cells. Examples of the battery 200 may include, but are not limited to, a lead acid battery, a Nickel Cadmium (NiCd) battery, a Nickel Metal Hydride (NIMH) battery, a lithium ion battery, a zinc air battery, or the like. In some embodiments, it may be required to authenticate the battery 200 of the electric vehicle 112 before powering the electric engine of the electric vehicle 112. In such a case, the battery 200 may not be enabled to power the electric vehicle 112 prior to the authentication thereof. In other words, the battery 200 may be enabled to power the electric vehicle 112 only after the successful authentication.

The processor 202 may include suitable logic, circuitry, interfaces, and/or code, executable by the circuitry, that may be configured to perform one or more operations associated with the offline battery authentication. Examples of the processor 202 may include, but are not limited to, an application-specific integrated circuit (ASIC) processor, a reduced instruction set computing (RISC) processor, a complex instruction set computing (CISC) processor, and a field-programmable gate array (FPGA). It will be apparent to a person of ordinary skill in the art that the processor 202 may be compatible with multiple operating systems.

In an exemplary embodiment, the processor 202 may be configured to generate one or more random numbers (such as the first random number) and one or more fleet flags (such as the fleet flag associated with the electric vehicle 112). The fleet flag may be generated based on a category of the electric vehicle 112. The processor 202 may be further configured to process encrypted data (such as one or more encrypted requests, encrypted messages, encrypted responses, or the like) to be communicated to other batteries of the electric vehicle 112. The processor 202 may be further configured to process the encrypted data to be communicated to the vehicle controller 110. The processor 202 may be further configured to process the encrypted data received from other batteries of the electric vehicle 112. The processor 202 may be further configured to process the encrypted data received from the vehicle controller 110. For example, the processor 202 (of the primary battery 102) may generate an authentication request including at least one of the first random number, the fleet flag, or the request identifier. The processor 202 may further encrypt the authentication request to obtain the encrypted authentication request. The processor 202 may further communicate the encrypted authentication request to other batteries (such as the secondary batteries 104, 106, and 108) and the vehicle controller 110. The processor 202 (of each of the secondary batteries 104, 106, and 108) may decrypt the encrypted authentication request to obtain at least the first random number and the fleet flag and store the first random number and the fleet flag in the respective memory 206. The processor 202 (of each battery such as the primary battery 102 and the secondary batteries 104, 106, and 108) may further receive the encrypted authentication response including at least the first random number, the second random number, and the vehicle identifier associated with the fleet flag from the vehicle controller 110. The processor 202 (of each battery) may further decrypt the encrypted authentication response to obtain at least the first random number and the vehicle identifier and communicate the first random number and the vehicle identifier to the respective authentication engine 204 for verification. The processor 202 (of each of the secondary batteries 104, 106, and 108) may further communicate the encrypted battery status including at least the first random number, the second random number, and the authentication status to the primary battery 102. The processor 202 (of the primary battery 102) may further decrypt the encrypted battery status received from each of the secondary batteries 104, 106, and 108 to obtain at least the first random number, the second random number, and the authentication status. The processor 202 (of the primary battery 102) may further communicate at least the first random number, the second random number, and the authentication status to the authentication engine 204 (of the primary battery 102) for verification. The processor 202 (of the primary battery 102) may further generate an authentication message including at least the authentication status, the first random number, and the second random number and decrypt the authentication message to obtain the encrypted authentication message. The processor 202 (of the primary battery 102) may further communicate the encrypted authentication message to the secondary batteries 104, 106, and 108 and the vehicle controller 110. The processor 202 (of each of the secondary batteries 104, 106, and 108) may further receive the encrypted authentication message form the primary battery 102 and decrypt the encrypted authentication message to obtain at least the first random number, the second random number, and the authentication status. The processor 202 (of each of the secondary batteries 104, 106, and 108) may further communicate at least the first random number, the second random number, and the authentication status to the respective authentication engine 204 for verification. The processor 202 (of each battery) may further receive the encrypted authentication message response including at least the first random number, the second random number, and the vehicle controller identifier from the vehicle controller 110. The processor 202 (of each battery) may further decrypt the encrypted authentication message response to obtain at least the first random number and the second random number and communicate at least the first random number and the second random number to the respective authentication engine 204 for verification.

The authentication engine 204 may include suitable logic, circuitry, interfaces, and/or code, executable by the circuitry, that may be configured to perform one or more operations associated with the offline battery authentication. The authentication engine 204 may be implemented by one or more processors, such as, but are not limited to, an ASIC processor, a RISC processor, a CISC processor, and an FPGA processor. Further, the authentication engine 204 may include a machine-learning model that implements any suitable machine-learning techniques, statistical techniques, or probabilistic techniques for performing verification of data during the one or more operations associated with the offline battery authentication.

In an exemplary embodiment, the authentication engine 204 (of each battery such as the primary battery 102 and the secondary batteries 104, 106, and 108) may be configured to verify the first random number and the vehicle identifier obtained from the decryption of the encrypted authentication response. The first random number and the vehicle identifier may be verified by performing a comparison check with a previously stored first random number and a previously stored vehicle identifier. The authentication engine 204 (of the primary battery 102) may be further configured to verify at least the first random number, the second random number, and the authentication status. The authentication engine 204 (of each of the secondary batteries 104, 106, and 108) may be further configured to verify at least the first random number, the second random number, and the authentication status for authenticating each battery. The authentication engine 204 (of each battery) may be further configured to verify at least the first random number and the second random number obtained from the decryption of the encrypted authentication message response and store the vehicle controller identifier in the respective memory 206 upon successful verification of the first random number and the second random number.

The memory 206 may include suitable logic, circuitry, interfaces, and/or code, executable by the circuitry, that may be configured to store one or more instructions that are executed by the processor 202 and the authentication engine 204 to perform their operations. In an exemplary embodiment, the memory 206 may be configured to temporarily store at least one of the first random number, the second random number, the fleet flag, the vehicle identifier, the authentication status, the vehicle controller identifier, the primary battery identifier, the secondary battery identifier, the request identifier, or the like. Examples of the memory 206 may include, but are not limited to, a random-access memory (RAM), a read-only memory (ROM), a programmable ROM (PROM), and an erasable PROM (EPROM).

It may be apparent to a person having ordinary skills in the art that the battery 200 described herein has been shown merely as an example and should not limit the scope of the disclosure. In some embodiments, the battery 200 may include additional or different components for realization and implementation of various functions thereof.

Figure 3:
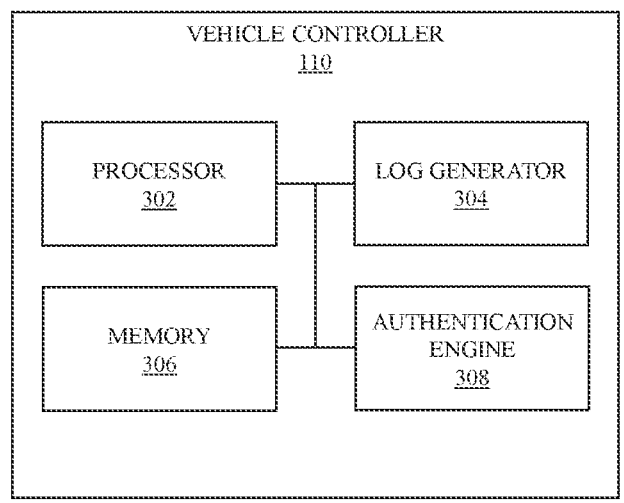
FIG. 3 is a block diagram of a vehicle controller of the electric vehicle of the system environment of FIG. 1, in accordance with an exemplary embodiment of the disclosure.
Figure 4A:
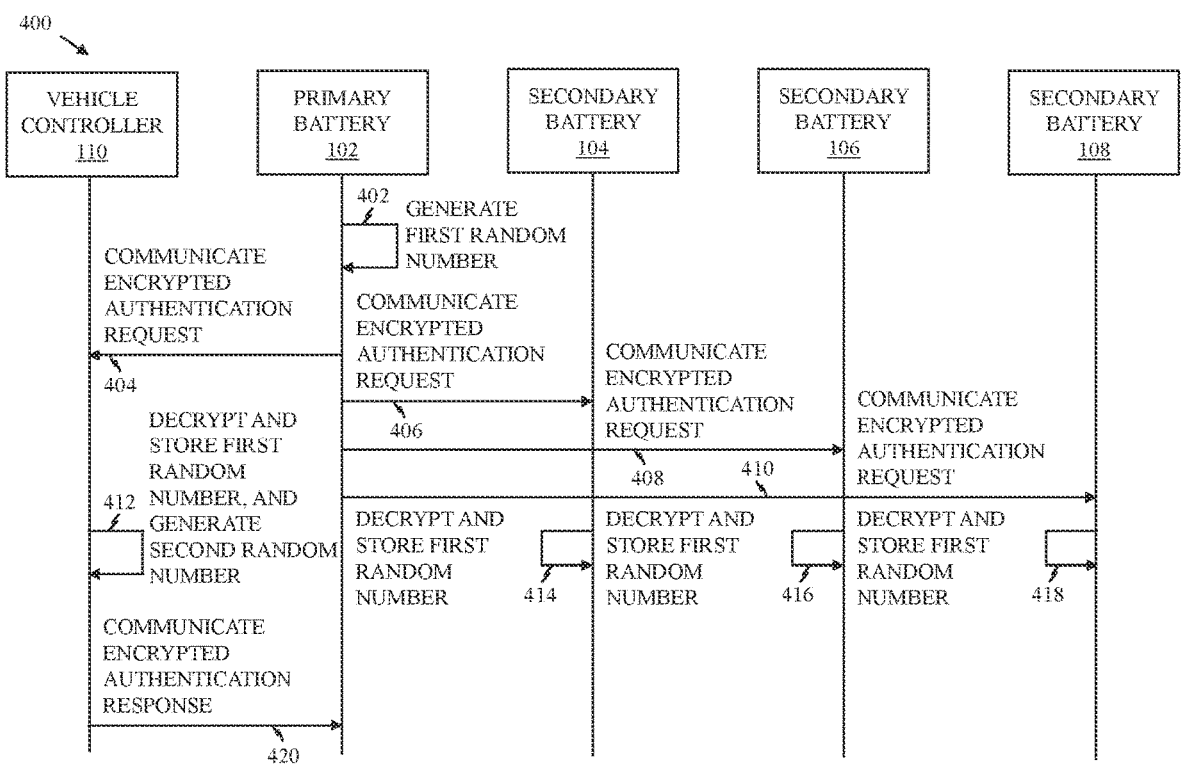
FIGS. 4A, 4B, 4C, and 4D, collectively, represent a process flow diagram that illustrates an exemplary scenario for performing the offline battery authentication, in accordance with an exemplary embodiment of the disclosure.
Figure 4B:
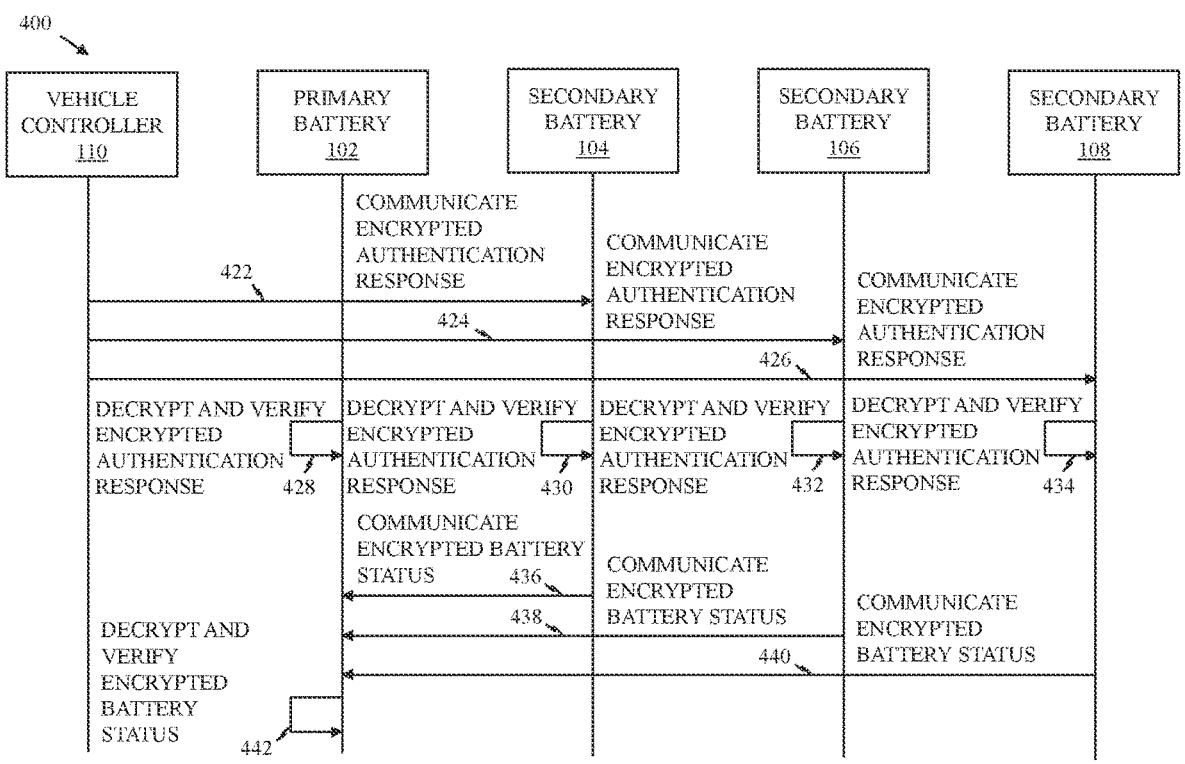
Figure 4C:
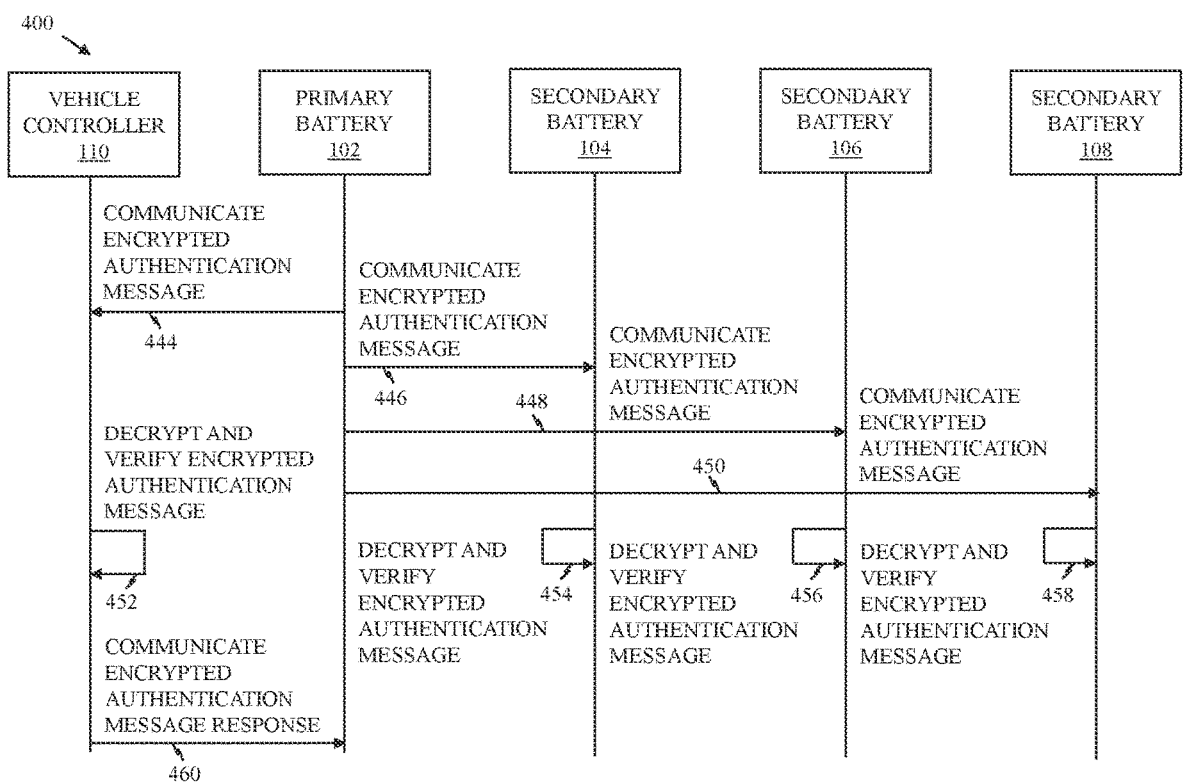
Figure 4D:
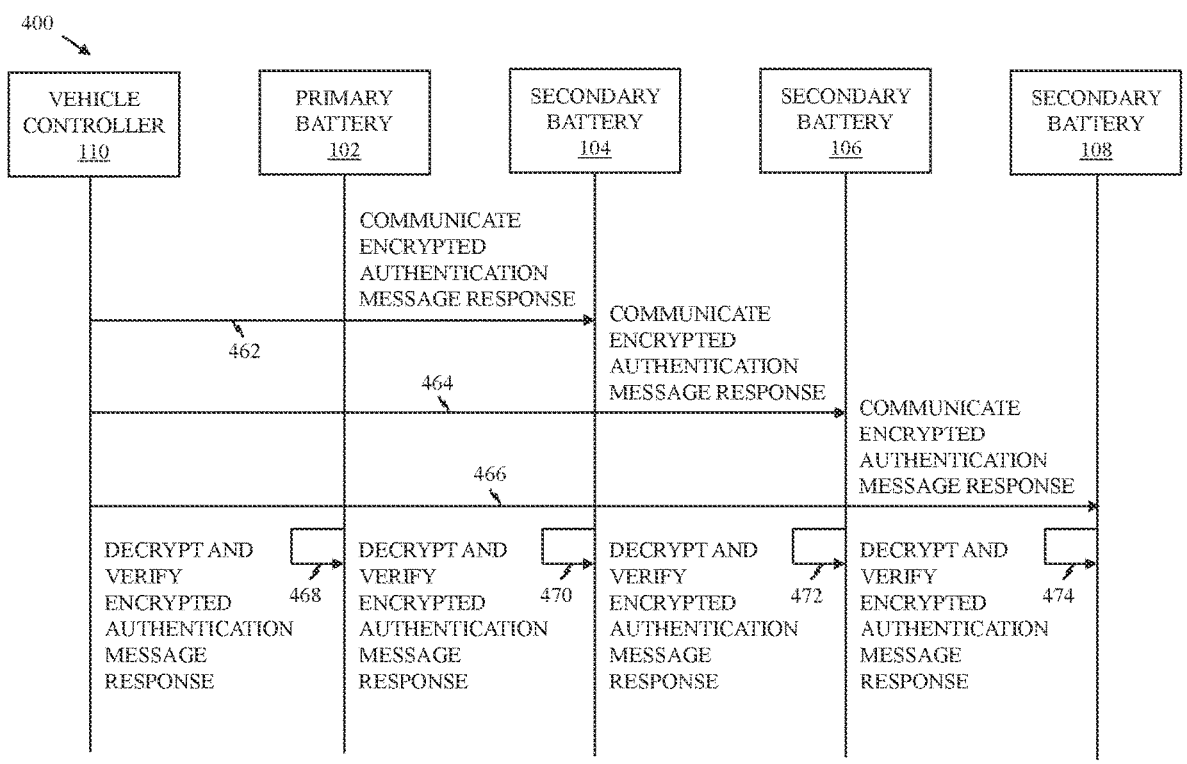

FIG. 3 is a block diagram of the vehicle controller 110 of the electric vehicle 112, in accordance with an exemplary embodiment of the disclosure. The vehicle controller 110 may include circuitry such as a processor 302, a log generator 304, a memory 306, and an authentication engine 308.

The processor 302 may include suitable logic, circuitry, interfaces, and/or code, executable by the circuitry, that may be configured to perform one or more operations associated with the offline battery authentication. Examples of the processor 302 may include, but are not limited to, an ASIC processor, a RISC processor, a CISC processor, and an FPGA. It will be apparent to a person of ordinary skill in the art that the processor 302 may be compatible with multiple operating systems.

In an exemplary embodiment, the processor 302 may be configured to receive the encrypted authentication request from the primary battery 102 and decrypt the encrypted authentication request to obtain at least the first random number and the fleet flag. The processor 302 may store at least one of the first random number or the fleet flag in the memory 306. The processor 302 may be further configured to generate the second random number and store in the memory 306. The processor 302 may be further configured to communicate the encrypted authentication response including at least the first random number, the second random number, and the vehicle identifier associated with the fleet flag to each battery (such as the primary battery 102 and the secondary batteries 104, 106, and 108). The processor 302 may be further configured to receive the encrypted authentication message including at least the first random number, the second random number, and the authentication status from the primary battery 102 and communicate at least the first random number, the second random number, and the authentication status to the authentication engine 308 for verification. The processor 302 may be further configured to communicate the encrypted authentication message response including at least the first random number, the second random number, and the vehicle controller identifier to each battery.

The log generator 304 may include suitable logic, circuitry, interfaces, and/or code, executable by the circuitry, that may be configured to generate a log of one or more batteries that are assigned to one or more electric vehicles such as the electric vehicle 112. The log generator 304 may be implemented by one or more processors, such as, but are not limited to, an ASIC processor, a RISC processor, a CISC processor, and an FPGA processor. Further, the log generator 304 may include a machine-learning model that implements any suitable machine-learning techniques, statistical techniques, or probabilistic techniques for generating the log of the one or more batteries. For example, the log generator 304 may create an entry for each battery that has been assigned to the electric vehicle 112. Further, each entry in the log generator 304 may include additional information associated with the one or more batteries. Such additional information may include the primary battery identifier associated with the primary battery 102, the secondary battery identifier associated with each of the secondary batteries 104, 106, and 108, a time instance or period of assignment of the one or more batteries to the electric vehicle 112, an authentication status, or the like.

The memory 306 may include logic, circuitry, interfaces, and/or code, executable by the circuitry, that may be configured to store one or more instructions that are executed by the processor 302, the log generator 304, and the authentication engine 308 to perform their operations. In an exemplary embodiment, the memory 306 may be configured to temporarily store at least one of the first random number, the second random number, the fleet flag, the vehicle identifier, the authentication status, the vehicle controller identifier, the primary battery identifier, the secondary battery identifier, the request identifier, or the like. Examples of the memory 306 may include, but are not limited to, a RAM, a ROM, a PROM, and an EPROM.

The authentication engine 308 may include suitable logic, circuitry, interfaces, and/or code, executable by the circuitry, that may be configured to perform one or more operations associated with the offline battery authentication. The authentication engine 308 may be implemented by one or more processors, such as, but are not limited to, an ASIC processor, a RISC processor, a CISC processor, and an FPGA processor. Further, the authentication engine 308 may include a machine-learning model that implements any suitable machine-learning techniques, statistical techniques, or probabilistic techniques for performing verification of data during the one or more operations associated with the offline battery authentication. In an exemplary embodiment, the authentication engine 308 may be configured to verify at least the first random number, the second random number, and the authentication status for authenticating each battery.

It may be apparent to a person having ordinary skills in the art that the vehicle controller 110 described herein has been shown merely as an example and should not limit the scope of the disclosure. In some embodiments, the vehicle controller 110 may include additional or different components for realization and implementation thereof.

FIGS. 4A, 4B, 4C, and 4D, collectively, represent a process flow diagram 400 that illustrates an exemplary scenario for performing the offline battery authentication, in accordance with an exemplary embodiment of the disclosure.

Before or during powering of the electric engine of the electric vehicle 112, the one or more batteries (such as the primary battery 102 and the one or more secondary batteries 104, 106, and 108) in the electric vehicle 112 may be required to undergo through the authentication process. The one or more batteries are parallelly authenticated in an offline manner by using the below process flow.

Firstly, the primary battery 102 may be configured to generate the first random number (as shown by arrow 402). The first random number may be a 32-bit number. Thereafter, the primary battery 102 may be further configured to communicate the encrypted authentication request to each of the vehicle controller 110 and the secondary batteries 104, 106 and 108 (as shown by arrows 404, 406, 408, and 410). The encrypted authentication request may include at least the first random number and the fleet flag. In an embodiment, the fleet flag may be determined based on a category of the electric vehicle 112. The category of the electric vehicle 112 may be one of an electric vehicle associated with an individual (such as a driver of the electric vehicle 112), a fleet of electric vehicles associated with an entity (such as a vehicle service provider), or a fleet of electric vehicles associated with an individual (such as a driver of the electric vehicle 112). In an exemplary embodiment, the fleet flag of the electric vehicle associated with the individual may be defined as "0", the fleet flag of the fleet of electric vehicles associated with the entity may be defined as "1", and the fleet flag of the fleet of electric vehicles associated with the individual may be defined as "2".

In an exemplary embodiment, when the electric vehicle 112 is owned by the driver, the encrypted authentication request includes "0" as the fleet flag. In another exemplary embodiment, when the fleet of electric vehicles (such as 50 electric vehicles) including the electric vehicle 112 is owned by a cab agency, the encrypted authentication request includes "1" as the fleet flag. In another exemplary embodiment, when the fleet of electric vehicles (such as 25 electric vehicles) including the electric vehicle 112 is owned by the driver, the encrypted authentication request includes "2" as the fleet flag.

In an embodiment, the encrypted authentication request may further include the request identifier. The request identifier may be a unique identifier that identifies a corresponding authentication request communicated by the primary battery 102. The request identifier may be used to identify a given authentication request from a log having a plurality of battery authentication records. The request identifier may be a symbol, a numerical sting, an alphabetical string, an alphanumeric string, or any combination thereof.

It will be apparent to a person having ordinary skills in the art that an authentication request (initiated by the primary battery 102) may be encrypted by using one or more encryption techniques that are well known in the art without deviating from scope of the disclosure. The one or more encryption techniques may be based on Advanced Encryption Standard (AES), Triple Data Encryption Standard (3DES), Twofish, or the like. In an embodiment, the primary battery 102 may be configured to initiate the authentication request and perform the encryption of the authentication request to obtain the encrypted authentication request. The encrypted authentication request may be a data packet having a size of 128 bits. The encrypted authentication request may be communicated periodically by the primary battery 102. In an example, the encrypted authentication request may be communicated at an interval of 10 milliseconds. Further, the periodic transmission may occur for a given number of times such as twice or thrice. Further, the encrypted authentication request may be assigned a controller area network identifier (CAN ID). The CAN ID for the encrypted authentication request that is sent to the secondary batteries 104, 106, and 108 and the vehicle controller 110 may be identical.

In an embodiment, each of the secondary batteries 104, 106, and 108 and the vehicle controller 110 may be configured to receive the encrypted authentication request from the primary battery 102. Further, each of the secondary batteries 104, 106, and 108 and the vehicle controller 110 may be configured to decrypt the encrypted authentication request to obtain at least the first random number and the fleet flag (as shown by arrows 412, 414, 416, and 418). The encrypted authentication request may be decrypted based on one or more decryption techniques associated with the one or more encryption techniques used for encrypting the authentication request. Upon decrypting the encrypted authentication request, each of the secondary batteries 104, 106, and 108 and the vehicle controller 110 may be further configured to store at least the first random number included in the encrypted authentication request (as shown by arrows 412, 414, 416, and 418). In an exemplary embodiment, the first random number may be stored in the memory 206 of each of the secondary batteries 104, 106, and 108. Further, the first random number may be stored in the memory 306 of the vehicle controller 110.

In an embodiment, the vehicle controller 110 may be further configured to generate the second random number (as shown by arrow 412). The second random number may be a 32-bit number. In an embodiment, the vehicle controller 110 may be further configured to communicate the encrypted authentication response to each battery (such as the primary battery 102 and the secondary batteries 104, 106, and 108) via the CAN bus 114 (as shown by arrows 420, 422, 424, and 426). The encrypted authentication response may include at least the first random number, the second random number, and the vehicle identifier associated with the fleet flag. The vehicle identifier may be a symbol, a numerical string, an alphabetical string, an alphanumerical string, or any combination thereof that is used to identify the electric vehicle 112. In an exemplary embodiment, when the fleet flag is "0", the vehicle identifier may be unique to the electric vehicle 112 associated with an individual. In another exemplary embodiment, when the fleet flag is "1", the vehicle identifier may be common to each electric vehicle 112 of the fleet of electric vehicles owned by the vehicle service provider. In another exemplary embodiment, when the fleet flag is "2", the vehicle identifier may be common to each electric vehicle 112 of the fleet of vehicles owned by the individual.

It will be apparent to a person having ordinary skills in the art that the authentication response (generated by the vehicle controller 110) may be encrypted using one or more encryption techniques that are well known in the art without deviating from scope of the disclosure. The one or more encryption techniques may be based on AES, 3DES, Twofish, or the like. In an embodiment, the vehicle controller 110 may be configured to generate the authentication response and perform the encryption of the authentication response to generate the encrypted authentication response. The encrypted authentication response may be a data packet having a size of 128 bits. The encrypted authentication response may be communicated periodically by the vehicle controller 110 to each battery of the electric vehicle 112. In an example, the encrypted authentication response may be communicated at an interval of 10 milliseconds. Further, the periodic transmission may occur for a given number of times such as twice or thrice. In an embodiment, the encrypted authentication response is assigned a CAN ID. The CAN ID for the encrypted authentication request that is sent to the primary battery 102 and the secondary batteries 104, 106, and 108 may be identical.

In an embodiment, each of the primary battery 102 and the secondary batteries 104, 106, and 108 may be further configured to receive the encrypted authentication response from the vehicle controller 110. Further, each of the primary battery 102 and the secondary batteries 104, 106, and 108 may be configured to decrypt the encrypted authentication response to obtain at least one of the first random number, the second random number, and the vehicle identifier (as shown by arrows 428, 430, 432, and 434). The encrypted authentication response may be decrypted based on one or more decryption techniques associated with the one or more encryption techniques used for encrypting the authentication response. Further, each of the primary battery 102 and the secondary batteries 104, 106, and 108 may be configured to store at least the second random number included in the encrypted authentication response. Further, each of the primary battery 102 and the secondary batteries 104, 106, and 108 may be configured to verify the first random number. The first random number may be verified by using the previously stored first random number. The first random number included in the encrypted authentication response may be matched with the previously stored first random number for verification thereof. An exact match of the first random number included in the encrypted authentication response with the previously stored first random number results in successful verification of the first random number. Further, each of the primary battery 102 and the secondary batteries 104, 106, and 108 may be configured to verify the vehicle identifier. The vehicle identifier may be verified by using a previously stored identifier associated with the electric vehicle 112. The identifier of the electric vehicle 112 may be previously included in user or vehicle information that is stored in each of the primary battery 102 and the secondary batteries 104, 106, and 108. The vehicle identifier may be matched with the previously stored identifier. An exact match of the vehicle identifier with the previously stored identifier results in successful verification of the vehicle identifier. Here, when the verification of at least one of the first random number or the vehicle identifier is unsuccessful, then the authentication of the one or more batteries of the electric vehicle 112 may be considered as a failed authentication. However, when the verification of the first random number and the vehicle identifier by each of the primary battery 102 and the secondary batteries 104, 106, and 108 is successful, then each of the secondary batteries 104, 106, and 108 may be further configured to communicate the encrypted battery status to the primary battery 102 via the CAN bus 114 (as shown by arrows 436, 438, and 440). Each encrypted battery status may include at least the first random number, the second random number, and the authentication status of the respective secondary battery. The authentication status may be determined based on the verification of the first random number and the vehicle identifier by each of the secondary batteries 104, 106, and 108. For example, the authentication status of a secondary battery (such as the secondary battery 104, 106, or 108) may be indicated by "1" when the first random number and the vehicle identifier are successfully verified by the secondary battery. However, the authentication status of a secondary battery (such as the secondary battery 104, 106, or 108) may be indicated by "0" when at least one of the first random number or the vehicle identifier is not successfully verified by the secondary battery.

In an embodiment, the encrypted battery status of each of the secondary batteries 104, 106, and 108 may further include the secondary battery identifier. The secondary battery identifier may be a unique identification number that identifies a corresponding secondary battery in the electric vehicle 112. The primary battery 102 may have a list of secondary battery identifiers of the secondary batteries 104, 106, and 108 that are associated therewith.

It will be apparent to a person having ordinary skills in the art that a battery status (generated by each of the secondary batteries 104, 106, and 108) may be encrypted using one or more encryption techniques that are well known in the art without deviating from scope of the disclosure. The one or more encryption techniques may be based on AES, 3DES, Twofish, or the like. In an embodiment, each of the secondary batteries 104, 106, and 108 may be configured to generate the battery status based on at least the verification of the first random number and the vehicle identifier and perform the encryption of the battery status to generate the encrypted battery status. The encrypted battery status may be a data packet having a size of 128 bits. The encrypted battery status may be communicated periodically by each of the secondary batteries 104, 106, and 108 to the primary battery 102 of the electric vehicle 112. In an example, the encrypted battery status may be communicated at an interval of 10 milliseconds. Further, the periodic transmission may occur for a given number of times such as twice or thrice. In an embodiment, the encrypted battery status is assigned a CAN ID. The CAN ID for the encrypted battery status that is sent to the primary battery 102 by each of the secondary batteries 104, 106, and 108 may be identical.

In an embodiment, the primary battery 102 may be further configured to receive the encrypted battery status from each of the secondary batteries 104, 106, and 108. Further, the primary battery 102 may be configured to decrypt the encrypted battery status of each of the secondary batteries 104, 106, and 108 (as shown by arrow 442). The encrypted battery status may be decrypted based on one or more decryption techniques associated with the one or more encryption techniques used for encrypting the battery status. Based on the decryption of the encrypted battery status communicated by each of the secondary batteries 104, 106, and 108, the primary battery 102 may obtain at least the first random number, the second random number, the authentication status, and the secondary battery identifier from each encrypted battery status. The primary battery 102 may be further configured to verify the first random number included in the encrypted battery status with the previously generated first random number. In addition, the primary battery 102 may verify the second random number included in the encrypted battery status with the previously stored second random number received with the encrypted authentication response. The primary battery 102 may also verify the secondary battery identifier by using the previously stored secondary battery identifier of each of the secondary batteries 104, 106, and 108. Further, the primary battery 102 may also verify the authentication status by checking for a successful or unsuccessful authentication status included in the encrypted battery status. Based on the verification of the authentication status of each of the secondary batteries 104, 106, and 108, the primary battery 102 may be further configured to generate a final authentication status. The final authentication status may be generated by performing one or more logical operations (such as an AND operation) on the authentication status of each of the secondary batteries 104, 106, and 108. For example, the final authentication status may correspond to "1" when the authentication status of each of the secondary batteries 104, 106, and 108 indicates "1" i.e., successful verification of the first random number and the vehicle identifier by each secondary battery. However, the final authentication status may correspond to "0" when the authentication status of at least one of the secondary batteries 104, 106, and 108 indicates "0" i.e., unsuccessful verification of at least one of the first random number or the vehicle identifier by at least one secondary battery. Beneficially, simultaneous verification of the secondary batteries 104, 106, and 108 by the primary battery 102 reduces time required for performing the verification of each of the secondary batteries 104, 106, and 108.

Furthermore, upon the verification of at least one of the first random number, the second random number, or the authentication status by the primary battery 102, the primary battery 102 may be configured to communicate the encrypted authentication message (for example, a final authentication status message) to each of the secondary batteries 104, 106, and 108 and the vehicle controller 110 via the CAN bus 114 (as shown by arrows 444, 446, 448, and 450). The encrypted authentication message may include at least one of the authentication status of each secondary battery, the final authentication status, the first random number, or the second random number. In an embodiment, the encrypted authentication message may further include the primary battery identifier of the primary battery 102. The primary battery identifier may be a unique identification number that identifies the primary battery 102 in the electric vehicle 112. The primary battery identifier may be a symbol, a numerical string, an alphabetical string, an alphanumeric string, or any combination thereof.

It will be apparent to a person having ordinary skills in the art that the authentication message (generated by the primary battery 102) may be encrypted using one or more encryption techniques that are well known in the art without deviating from scope of the disclosure. The one or more encryption techniques may be based on AES, 3DES, Twofish, or the like. In an embodiment, the primary battery 102 may be configured to generate the authentication message and perform the encryption of the authentication message to generate the encrypted authentication message. The encrypted authentication message may be a data packet having a size of 128 bits. The encrypted authentication message may be communicated periodically by the primary battery 102 to each of the secondary batteries 104, 106, and 108 and the vehicle controller 110 of the electric vehicle 112. In an example, the encrypted authentication message may be communicated at an interval of 10 milliseconds. Further, the periodic transmission may occur for a given number of times such as twice or thrice. In an embodiment, the encrypted authentication message is assigned a CAN ID. The CAN ID for the encrypted authentication message that is sent to each of the secondary batteries 104, 106, and 108 and the vehicle controller 110 by the primary battery 102 may be identical.

Furthermore, each of the secondary batteries 104, 106, and 108 and the vehicle controller 110 may be configured to receive the encrypted authentication message from the primary battery 102. Further, each of the secondary batteries 104, 106, and 108 and the vehicle controller 110 may be configured to decrypt the encrypted authentication message (as shown by arrows 452, 454, 456, and 458). The encrypted authentication message may be decrypted based on one or more decryption techniques associated with the one or more encryption techniques used for encrypting the authentication message. Upon decryption of the encrypted authentication message, each of the secondary batteries 104, 106, and 108 and the vehicle controller 110 may be further configured to verify at least one of the first random number, the second random number, the authentication status, or the final authentication status for authenticating each battery (as shown by arrows 452, 452, 456, and 458). In an exemplary embodiment, the first random number included in the encrypted authentication message may be verified by matching with the previously stored first random number by each of the secondary batteries 104, 106, and 108 and the vehicle controller unit 110. The second random number included in the encrypted authentication message may be verified by matching with the previously stored second random number by each of the secondary batteries 104, 106, and 108 and the vehicle controller unit 110. The authentication status included in the encrypted authentication message may be verified based on successful or unsuccessful authentication status of each of the secondary batteries 104, 106, and 108. The successful authentication status of each of the secondary batteries 104, 106, and 108 results in successful verification of the authentication status of each of the secondary batteries 104, 106, and 108 included in the encrypted authentication message. The unsuccessful authentication status of at least one of the secondary batteries 104, 106, and 108 results in unsuccessful verification of authentication status, of each of the secondary batteries 104, 106, and 108, included in the encrypted authentication message. The final authentication status may be used to identify the one or more batteries (such as the primary 102 and/or the secondary batteries 104, 106, 108) that are successfully or unsuccessfully authenticated. The final authentication status may indicate successful authentication based on successful authentication of all batteries included in the electric vehicle 112. The final authentication status may indicate unsuccessful authentication of the one or more batteries based on unsuccessful authentication of the one or more batteries of the electric vehicle 112. Accordingly, a notification message may be generated (for example, by the vehicle controller 110) based on at least one of the authentication status of each battery or the final authentication status and may be further communicated to a user of the electric vehicle 112. Furthermore, the vehicle controller 110 may not use the one or more batteries that have not been successfully authenticated for powering the electric vehicle 112 by disconnecting the one or more batteries from a power grid that connects the one or more batteries to the electric engine of the electric vehicle 112.

In an embodiment, upon successful verification of at least one of the first random number, the second random number, or the authentication status included in the encrypted authentication message, the vehicle controller 110 may be further configured to communicate the encrypted authentication message response to each of the primary battery 102 and the secondary batteries 104, 106, and 108 (as shown by arrows 460, 462, 464, and 466). The encrypted authentication message response may include at least one of the first random number, the second random number, or the vehicle controller identifier. The vehicle controller identifier may be a symbol, a numerical string, an alphabetical string, an alphanumerical string, or any combination thereof that uniquely identifies the vehicle controller 110 of the electric vehicle 112. The encrypted authentication message response may be communicated via the CAN bus 114. The communication of the encrypted authentication message response assures that the encrypted authentication message has been received by the vehicle controller 110.

It will be apparent to a person having ordinary skills in the art that the authentication message response (generated by the vehicle controller 110) may be encrypted using one or more encryption techniques that are well known in the art without deviating from scope of the disclosure. The one or more encryption techniques may be based on AES, 3DES, Twofish, or the like. In an embodiment, the vehicle controller 110 may be configured to generate the authentication message response and perform the encryption of the authentication message response to generate the encrypted authentication message response. The encrypted authentication message response may be a data packet having a size of 128 bits. The encrypted authentication message response may be communicated periodically by the vehicle controller 110 to each of the primary battery 102 and the secondary batteries 104, 106, and 108 of the electric vehicle 112. In an example, the encrypted authentication message response may be communicated at an interval of 10 milliseconds. Further, the periodic transmission may occur for a given number of times such as twice or thrice. In an embodiment, the encrypted authentication message response is assigned a CAN ID. The CAN ID for the encrypted authentication message response that is sent to each of the primary battery 102 and the secondary batteries 104, 106, and 108 by the vehicle controller 110 may be identical.

In an embodiment, each of the primary battery 102 and the secondary batteries 104, 106, and 108 may be further configured to receive the encrypted authentication message response from the vehicle controller 110. Further, each of the primary battery 102 and the secondary batteries 104, 106, and 108 may be configured to decrypt the encrypted authentication message response (as shown by arrows 468, 470, 472, and 474). The encrypted authentication message response may be decrypted based on one or more decryption techniques associated with the one or more encryption techniques used for encrypting the authentication message response. Upon decryption of the encrypted authentication message response, the primary battery 102 may verify the first random number included in the encrypted authentication message by performing a match with the previously generated first random number. Further, each of the secondary batteries 104, 106, and 108 may verify the first random number included in the encrypted authentication message by performing a match with the previously stored first random number. Furthermore, each of the secondary batteries 104,

106, and 108 may verify the second random number included in the encrypted authentication message by performing a match with the previously stored second random number. Upon successful verification of the first random number and the second random number, each of the primary battery 102 and the secondary batteries 104, 106, and 108 may be further configured to store the vehicle controller identifier. In an embodiment, each battery may store the vehicle controller identifier in the memory 206. Beneficially, storing the vehicle controller identifier may allow the one or more batteries to keep a record of the electric vehicle 112 to which they have been assigned.

Thus, various methods and systems of the disclosure provide the offline authentication of the one or more batteries (such as the primary battery 102 and/or the secondary batteries 104, 106, and 108) of the electric vehicle 112. The disclosed methods and systems allow for the offline authentication of the one or more batteries that prevents the electric vehicle 112 from getting stranded in case of connectivity failure. The disclosed methods and systems create a secure offline parallel authentication mechanism that avoids server dependency as it is complete offline based. The offline parallel authentication mechanism helps in stopping any sniffing attack on the CAN bus 114 of the electric vehicle 112 as these are encrypted payload. The offline parallel authentication mechanism helps in stopping any spoofing attack and replay attack as it works on a dynamic random number during every ignition cycle i.e., when the electric engine of the electric vehicle 112 is powered by the one or more batteries of the electric vehicle 112. The offline parallel authentication mechanism helps in performing parallel authentication of 'N' number of batteries thereby completely optimizing time for security checks. Here, 'N' corresponds to an integer that is greater than or equal to '1' (i.e., N>=1).

Figure 5:
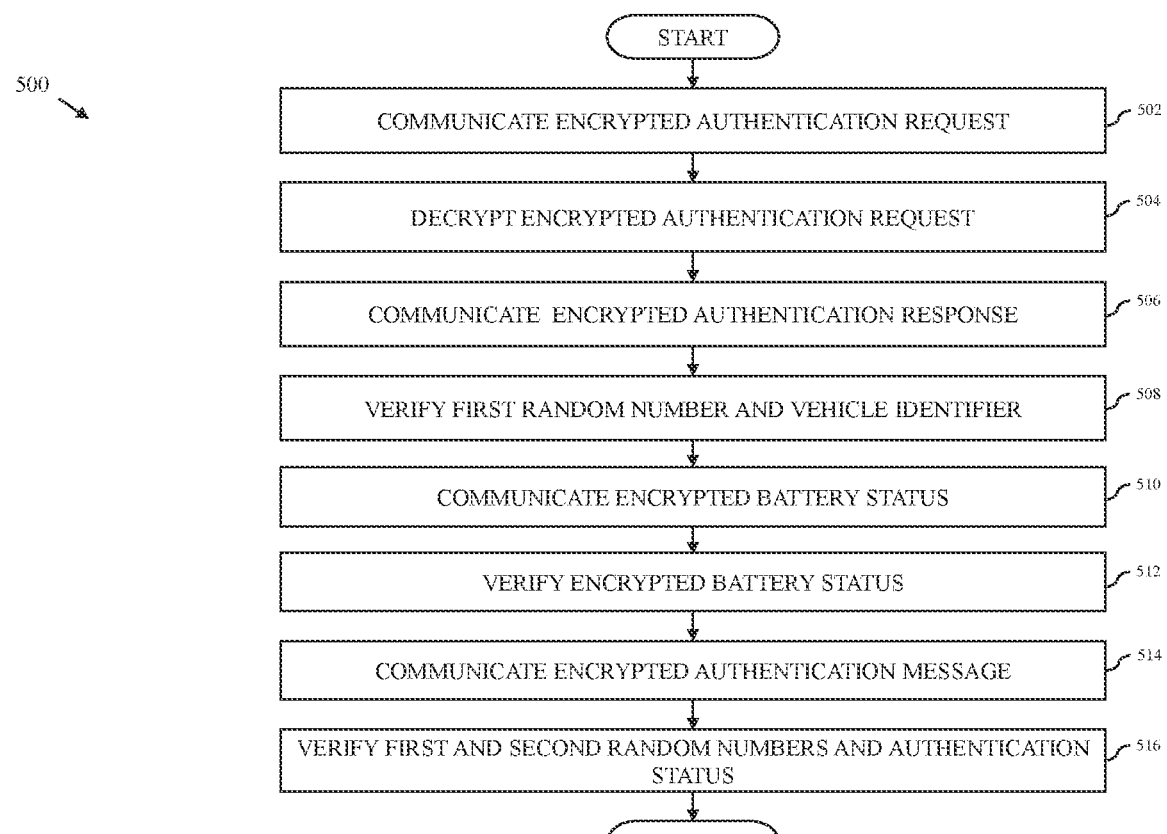
FIG. 5 is a high-level flow chart that illustrates a method for performing the offline battery authentication, in accordance with an exemplary embodiment of the disclosure.

FIG. 5 is a high-level flow chart 500 that illustrates a method for performing the offline battery authentication, in accordance with an exemplary embodiment of the disclosure.

At 502, the encrypted authentication request is communicated. In an embodiment, the primary battery 102 may be configured to communicate the encrypted authentication request to each of the secondary batteries 104, 106, and 108 and the vehicle controller 110 of the electric vehicle 112 via the CAN bus 114. The encrypted authentication request may include at least the first random number and the fleet flag. The encrypted authentication request may further include the request identifier.

At 504, the encrypted authentication request is decrypted. In an embodiment, each of the secondary batteries 104, 106, and 108 and the vehicle controller 110 may be configured to decrypt the encrypted authentication request to obtain at least the first random number and the fleet flag.

At 506, the encrypted authentication response is communicated. In an embodiment, the vehicle controller 110 may be further configured to communicate the encrypted authentication response to each battery (such as the primary battery 102 and the secondary batteries 104, 106, and 108) via the CAN bus 114. The encrypted authentication response may include at least the first random number, the second random number, and the vehicle identifier associated with the fleet flag.

At 508, the first random number and the vehicle identifier are verified. In an embodiment, each battery may be further configured to decrypt the encrypted authentication response to obtain the first random number and the vehicle identifier and verify the first random number and the vehicle identifier. The first random number may be verified based on the previously stored first random number and the vehicle identifier may be verified based on the previously stored vehicle identifier.

At 510, the encrypted battery status is communicated. In an embodiment, each of the secondary batteries 104, 106, and 108 may be further configured to communicate the encrypted battery status to the primary battery 102 via the CAN bus 114. The encrypted battery status may include at least the first random number, the second random number, and the authentication status. The authentication status may be determined based on verification of the first random number and the vehicle identifier by each of the secondary batteries 104, 106, and 108.

At 512, the encrypted battery status is verified. In an embodiment, the primary battery 102 may be further configured to verify the encrypted battery status. The encrypted battery status may include at least the first random number, the second random number, and the authentication status. The encrypted battery status of each secondary battery may further include the secondary battery identifier. Prior to the verification, the primary battery 102 may be further configured to decrypt the encrypted battery status of each of the secondary batteries 104, 106, and 108 to obtain at least the first random number, the second random number, and the authentication status. Thereafter, the primary battery 102 may be configured to verify at least the first random number, the second random number, and the authentication status.

At 514, the encrypted authentication message is communicated. In an embodiment, the primary battery 102 may be further configured to communicate the encrypted authentication message to each of the secondary batteries 104, 106, and 108 and the vehicle controller 110 via the CAN bus 114. The encrypted authentication message may include at least the authentication status, the first random number, and the second random number. The encrypted authentication message may further include the primary battery identifier of the primary battery 102.

At 516, the first random number, the second random number, and the authentication status are verified. In an embodiment, each of the secondary batteries 104, 106, and 108 and the vehicle controller 110 may be further configured to verify at least the first random number, the second random number, and the authentication status. Prior to the verification, each of the secondary batteries 104, 106, and 108 and the vehicle controller 110 may be further configured to decrypt the encrypted authentication message to obtain at least the first random number, the second random number, and the authentication status. Thereafter, each of the secondary batteries 104, 106, and 108 and the vehicle controller 110 may be configured to verify at least the first random number, the second random number, and the authentication status for authenticating each battery.

Figure 6A:
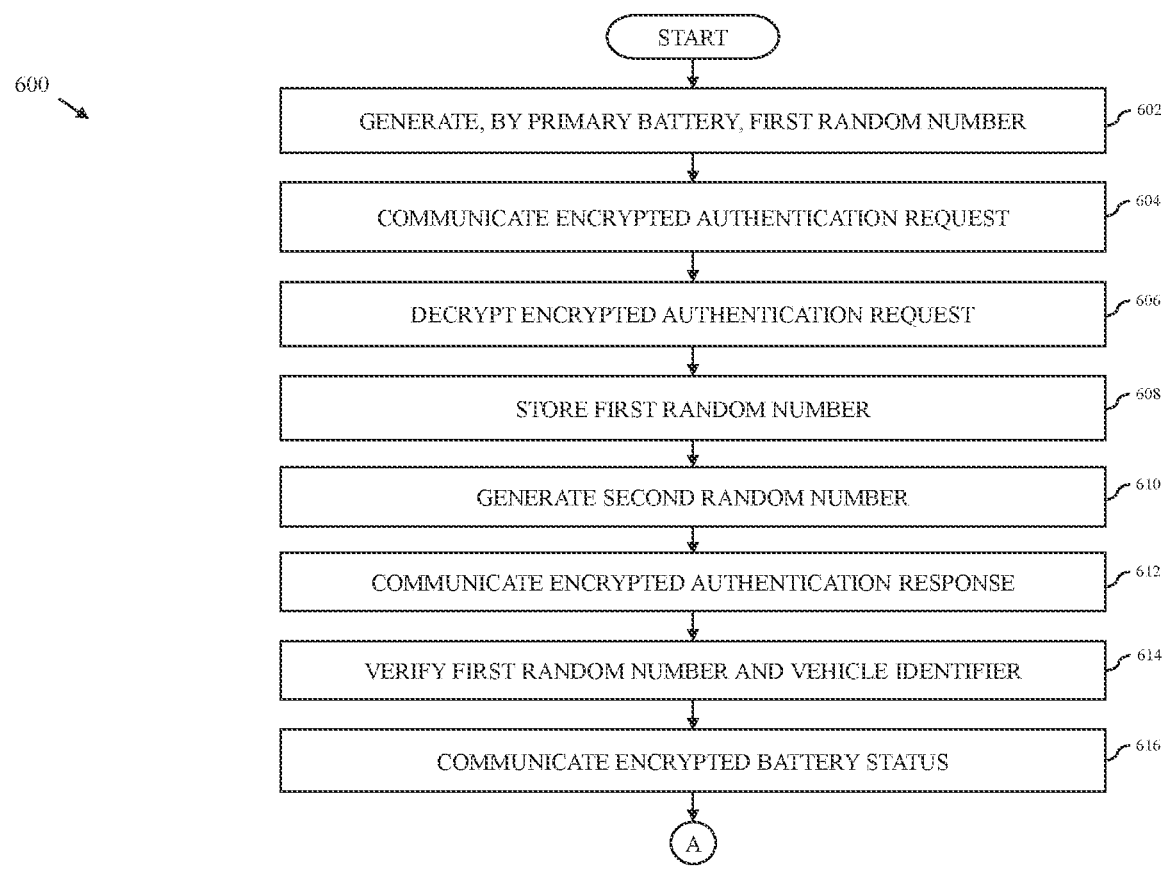
FIGS. 6A and 6B, collectively, illustrate a flow chart of a method for performing the offline battery authentication, in accordance with an exemplary embodiment of the disclosure.
Figure 6B:
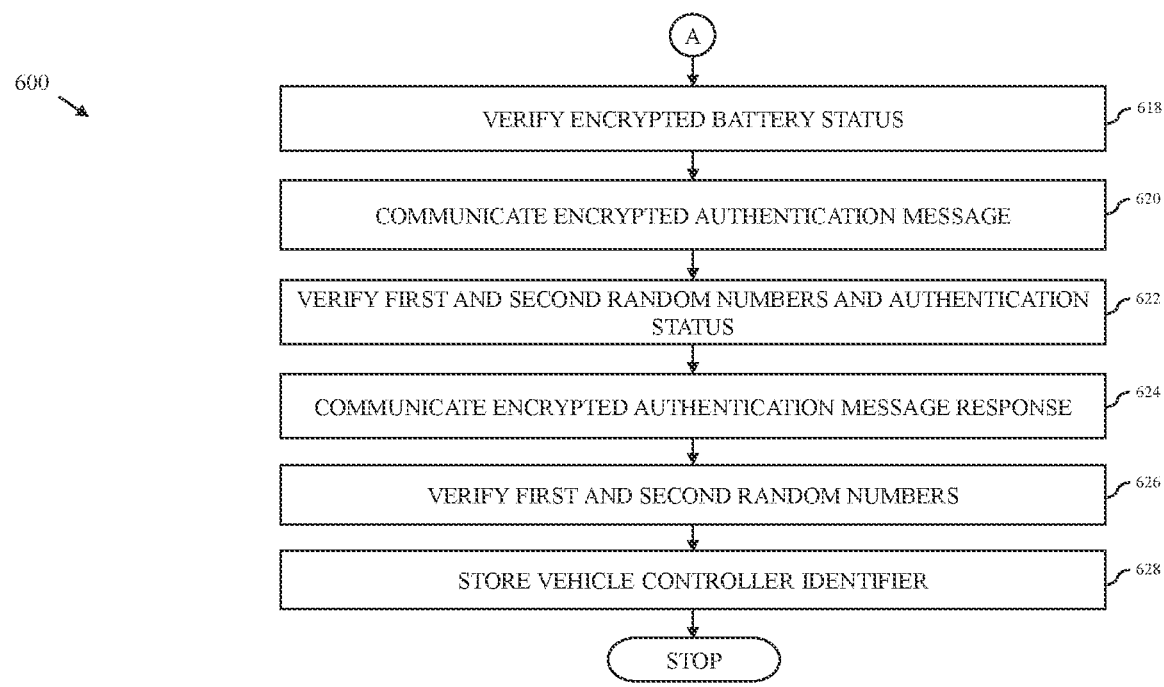

FIGS. 6A and 6B, collectively, illustrate a flow chart 600 of a method for performing the offline battery authentication, in accordance with an exemplary embodiment of the disclosure.

At 602, the first random number is generated. In an embodiment, the primary battery 102 may be configured to generate the first random number.

At 604, the encrypted authentication request is communicated. In an embodiment, the primary battery 102 may be further configured to communicate the encrypted authentication request to each of the secondary batteries 104, 106, and 108 and the vehicle controller 110 of the electric vehicle 112 via the CAN bus 114. The encrypted authentication request includes at least the first random number and the fleet flag. The encrypted authentication request may further include the request identifier.

At 606, the encrypted authentication request is decrypted. In an embodiment, each of the secondary batteries 104, 106, and 108 and the vehicle controller 110 may be configured to decrypt the encrypted authentication request to obtain at least the first random number and the fleet flag.

At 608, the first random number is stored. In an embodiment, each of the secondary batteries 104, 106, and 108 and the vehicle controller 110 may be further configured to store the first random number.

At 610, the second random number is generated. In an embodiment, the vehicle controller 110 may be further configured to generate the second random number.

At 612, the encrypted authentication response is communicated. In an embodiment, the vehicle controller 110 may be further configured to communicate the encrypted authentication response to each battery via the CAN bus 114. The encrypted authentication response may include at least the first random number, the second random number, and the vehicle identifier associated with the fleet flag.

At 614, the first random number and the vehicle identifier are verified. In an embodiment, each battery may be further configured to verify, upon decrypting the encrypted authentication response, the first random number and the vehicle identifier included in the encrypted authentication response. The first random number may be verified based on the previously stored first random number and the vehicle identifier may be verified based on the previously stored vehicle identifier.

At 616, the encrypted battery status is communicated. In an embodiment, each of the secondary batteries 104, 106, and 108 may be further configured to communicate the encrypted battery status to the primary battery 102. The encrypted battery status may include at least the first random number, the second random number, and the authentication status. The authentication status may be determined based on verification of the first random number and the vehicle identifier by each of the secondary batteries 104, 106, and 108.

At 618, the encrypted battery status is verified. In an embodiment, the primary battery 102 may be further configured to verify the encrypted battery status. The encrypted battery status may include at least the first random number, the second random number, and the authentication status. The encrypted battery status of each secondary battery may further include the secondary battery identifier. Prior to the verification, the primary battery 102 may be further configured to decrypt the encrypted battery status of each of the secondary batteries 104, 106, and 108 to obtain at least the first random number, the second random number, and the authentication status. Thereafter, the primary battery 102 may be configured to verify at least the first random number, the second random number, and the authentication status.

At 620, the encrypted authentication message is communicated. In an embodiment, the primary battery 102 may be further configured to communicate the encrypted authentication message to each of the secondary batteries 104, 106, and 108 and the vehicle controller 110 via the CAN bus 114. The encrypted authentication message may include at least the authentication status, the first random number, and the second random number. The encrypted authentication message may further include the primary battery identifier of the primary battery 102.

At 622, the first random number, the second random number, and the authentication status are verified. In an embodiment, each of the secondary batteries 104, 106, and 108 and the vehicle controller 110 may be further configured to verify at least the first random number, the second random number, and the authentication status. Prior to the verification, each of the secondary batteries 104, 106, and 108 and the vehicle controller 110 may be further configured to decrypt the encrypted authentication message to obtain at least the first random number, the second random number, and the authentication status. Thereafter, each of the secondary batteries 104, 106, and 108 and the vehicle controller 110 may be configured to verify at least the first random number, the second random number, and the authentication status for authenticating each battery.

At 624, the encrypted authentication message response is communicated. In an embodiment, the vehicle controller 110 may be further configured to communicate the encrypted authentication message response to each battery via the CAN bus 114. The encrypted authentication message response may include at least the first random number, the second random number, and the vehicle controller identifier.

At 626, the first random number and the second random number are verified. In an embodiment, each battery (such as the primary battery 102 and the secondary batteries 104, 106, and 108), upon decrypting the encrypted authentication message response, may be further configured to verify the first random number and the second random number included in the encrypted authentication message response.

At 628, the vehicle controller identifier is stored. In an embodiment, each battery, upon successful verification of the first random number and the second random number, may be further configured to store the vehicle controller identifier included in the encrypted authentication message response.

Figure 7:
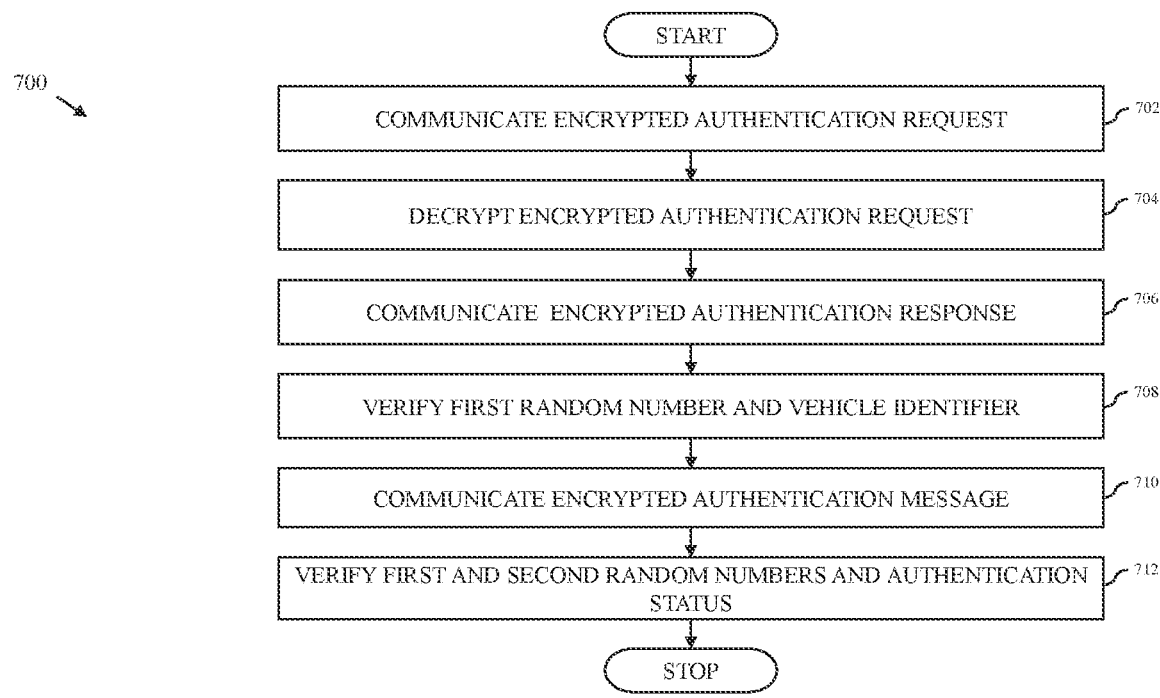
FIG. 7 is a high-level flow chart that illustrates a method for performing the offline battery authentication, in accordance with another exemplary embodiment of the disclosure.

FIG. 7 is a high-level flow chart 700 that illustrates a method for performing the offline battery authentication, in accordance with another exemplary embodiment of the disclosure.

At 702, the encrypted authentication request is communicated. In an embodiment, the primary battery 102 may be configured to communicate the encrypted authentication request to the vehicle controller 110 of the electric vehicle 112 via the CAN bus 114. The encrypted authentication request may include at least the first random number and the fleet flag. The encrypted authentication request may further include the request identifier.

At 704, the encrypted authentication request is decrypted. In an embodiment, the vehicle controller 110 may be configured to decrypt the encrypted authentication request to obtain at least the first random number and the fleet flag.

At 706, the encrypted authentication response is communicated. In an embodiment, the vehicle controller 110 may be further configured to communicate the encrypted authentication response to the primary battery 102 via the CAN bus 114. The encrypted authentication response may include at least the first random number, the second random number, and the vehicle identifier associated with the fleet flag.

At 708, the first random number and the vehicle identifier are verified. In an embodiment, the primary battery 102 may be further configured to decrypt the encrypted authentication response to obtain the first random number and the vehicle identifier and verify the first random number and the vehicle identifier. The first random number may be verified based on the previously stored first random number and the vehicle identifier may be verified based on the previously stored vehicle identifier.

At 710, the encrypted authentication message is communicated. In an embodiment, the primary battery 102 may be further configured to communicate the encrypted authentication message to the vehicle controller 110 via the CAN bus 114. The encrypted authentication message may include at least the authentication status, the first random number, and the second random number. The authentication status may indicate successful or unsuccessful authentication of the primary battery 102. The encrypted authentication message may further include the primary battery identifier of the primary battery 102.

At 712, the first random number, the second random number, and the authentication status are verified. In an embodiment, the vehicle controller 110 may be further configured to verify at least the first random number, the second random number, and the authentication status. Prior to the verification, the vehicle controller 110 may be further configured to decrypt the encrypted authentication message to obtain at least the first random number, the second random number, and the authentication status. Thereafter, the vehicle controller 110 may be configured to verify at least the first random number, the second random number, and the authentication status for authenticating at least the primary battery 102. Further, the vehicle controller 110 may be configured to communicate the encrypted authentication message response to the primary battery 102. The encrypted authentication message response may include at least the first random number, the second random number, and the vehicle controller identifier. Upon decrypting the encrypted authentication message response, the primary battery 102 may be further configured to verify at least the first random number. Further, upon successful verification of at least the first random number, the primary battery 102 may be configured to store the vehicle controller identifier.

Figure 8:
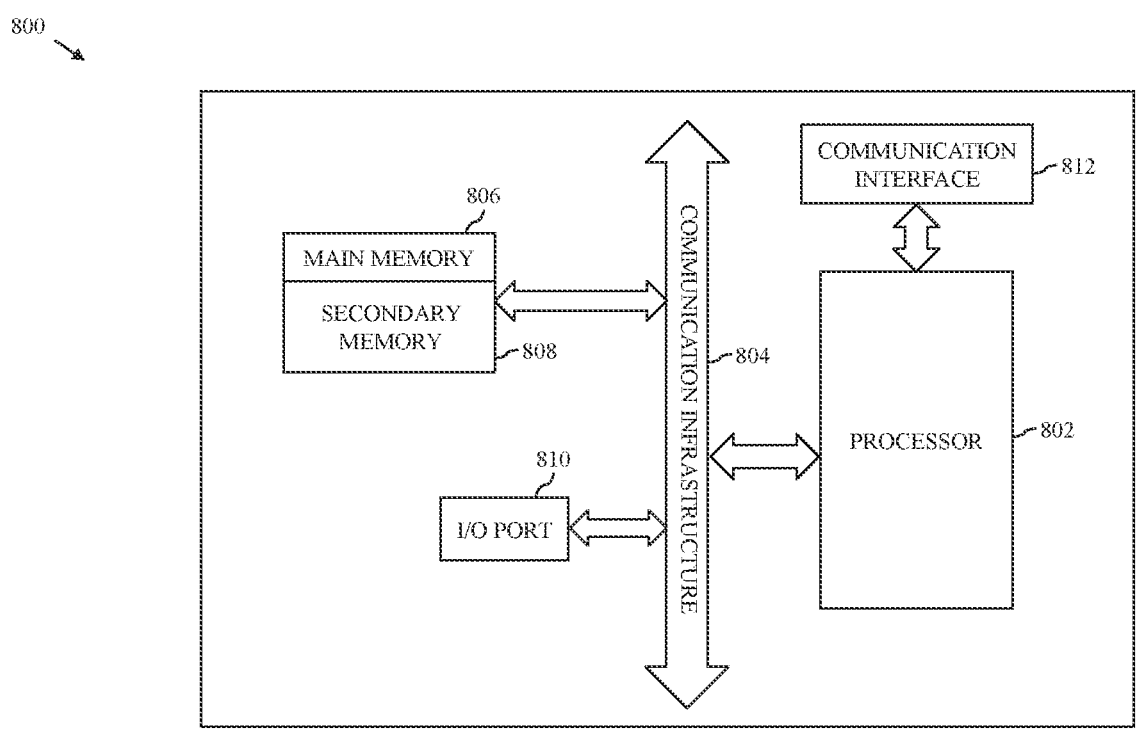
FIG. 8 is a block diagram that illustrates a system architecture of a computer system for performing the offline battery authentication, in accordance with an exemplary embodiment of the disclosure.

FIG. 8 is a block diagram that illustrates a system architecture of a computer system 800 for performing the offline battery authentication, in accordance with an exemplary embodiment of the disclosure. An embodiment of the disclosure, or portions thereof, may be implemented as computer readable code on the computer system 800. In one example, the primary battery 102, the secondary battery 104, 106, or 108, and/or the vehicle controller 110 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the offline battery authentication methods of FIGS. 4A-4D, 5, 6A-6B, and 7.

The computer system 800 may include a processor 802 that may be a special purpose or a general-purpose processing device. The processor 802 may be a single processor, multiple processors, or combinations thereof. The processor 802 may have one or more processor "cores." Further, the processor 802 may be coupled to a communication infrastructure 804, such as a bus, a bridge, a message queue, multi-core message-passing scheme, the communication network, the CAN bus 114, or the like. The computer system 800 may further include a main memory 806 and a secondary memory 808. Examples of the main memory 806 may include RAM, ROM, and the like. The secondary memory 808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 800 may further include an input/output (I/O) port 810 and a communication interface 812. The I/O port 810 may include various input and output devices that are configured to communicate with the processor 802. Examples of the input devices may include a keyboard, a mouse, a joystick, a touchscreen, a microphone, and the like. Examples of the output devices may include a display, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communication port, and the like. Data transferred via the communication interface 812 may be signals, such as electronic, electromagnetic, optical, or other signals as will be apparent to a person skilled in the art. The signals may travel via a communications channel, such as the CAN bus 114, which may be configured to transmit the signals to the various devices that are communicatively coupled to the computer system 800. Examples of the communication channel may include a wired, wireless, and/or optical medium such as cable, fiber optics, a phone line, a cellular phone link, a radio frequency link, and the like. The main memory 806 and the secondary memory 808 may refer to non-transitory computer readable mediums that may provide data that enables the computer system 800 to implement the offline battery authentication methods illustrated in FIGS. 4A-4D, 5, 6A-6B, and 7.

Various embodiments of the disclosure provide one or more batteries (such as the primary battery 102 and/or the secondary batteries 104, 106, and 108) and a vehicle control unit (such as the vehicle controller 110) of the electric vehicle 112 for performing the offline battery authentication. The primary battery 102 may be configured to communicate the encrypted authentication request to the secondary batteries 104, 106, and 108 and the vehicle controller 110 via the CAN bus 114. The encrypted authentication request includes at least the first random number and the fleet flag. The secondary batteries 104, 106, and 108 and the vehicle controller 110 may be configured to decrypt the encrypted authentication request to obtain at least the first random number and the fleet flag. The vehicle controller 110 may be further configured to communicate the encrypted authentication response to each battery via the CAN bus 114. The encrypted authentication response includes at least the first random number, the second random number, and the vehicle identifier associated with the fleet flag. Each battery may be further configured to verify, upon decrypting the encrypted authentication response, the first random number and the vehicle identifier. Each of the secondary batteries 104, 106, and 108 may be further configured to communicate the encrypted battery status to the primary battery 102 via the CAN bus 114. The encrypted battery status may include at least the first random number, the second random number, and the authentication status. The authentication status may be determined based on verification of the first random number and the vehicle identifier by each of the secondary batteries 104, 106, and 108. The primary battery 102 may be further configured to verify, upon decrypting the encrypted battery status of each of the secondary batteries 104, 106, and 108, at least the first random number, the second random number, and the authentication status. The primary battery 102 may be further configured to communicate the encrypted authentication message including at least the authentication status, the first random number, and the second random number to the secondary batteries 104, 106, and 108 and the vehicle controller 110 via the CAN bus 114. The secondary batteries 104, 106, and 108 and the vehicle controller 110 may be further configured to verify, upon decrypting the encrypted authentication message, at least the first random number, the second random number, and the authentication status for authenticating each battery.

Various embodiments of the disclosure provide a non-transitory computer readable medium having stored thereon, computer executable instructions, which when executed by a computer, cause the computer to execute operations for the offline battery authentication. The operations include communicating, by the primary battery 102 of the electric vehicle 112 via the CAN bus 114, the encrypted authentication request to the secondary batteries 104, 106, and 108 and the vehicle controller 110 of the electric vehicle 112. The encrypted authentication request includes at least the first random number and the fleet flag. The operations further include decrypting, by the secondary batteries 104, 106, and 108 and the vehicle controller 110, the encrypted authentication request to obtain at least the first random number and the fleet flag. The operations further include communicating, by the vehicle controller 110 via the CAN bus 114, an encrypted authentication response to each battery. The encrypted authentication response includes at least the first random number, the second random number, and the vehicle identifier associated with the fleet flag. The operations further include verifying, by each battery, upon decrypting the encrypted authentication response, the first random number and the vehicle identifier. The operations further include communicating, by each of the secondary batteries 104, 106, and 108 via the CAN bus 114, the encrypted battery status to the primary battery 102. The encrypted battery status includes at least the first random number, the second random number, and an authentication status. The authentication status is determined based on verification of the first random number and the vehicle identifier by each of the secondary batteries 104, 106, and 108. The operations further include verifying, by the primary battery 102, upon decrypting the encrypted battery status of each of the secondary batteries 104, 106, and 108, at least the first random number, the second random number, and the authentication status. The operations further include communicating, by the primary battery 102 via the CAN bus 114, the encrypted authentication message including at least the authentication status, the first random number, and the second random number to the secondary batteries 104, 106, and 108 and the vehicle controller 110. The operations further include verifying, by the secondary batteries 104, 106, and 108 and the vehicle controller 110, upon decrypting the encrypted authentication message, at least the first random number, the second random number, and the authentication status for authenticating each battery.

Various embodiments of the disclosure further provide a non-transitory computer readable medium having stored thereon, computer executable instructions, which when executed by a computer, cause the computer to execute operations for the offline battery authentication. The operations include communicating, by the primary battery 102 of the electric vehicle 112 via the CAN bus 114, the encrypted authentication request to the vehicle controller 110 of the electric vehicle 112. The encrypted authentication request includes at least the first random number and the fleet flag. The operations further include decrypting, by the vehicle controller 110, the encrypted authentication request to obtain at least the first random number and the fleet flag. The operations further include communicating, by the vehicle controller 110 via the CAN bus 114, an encrypted authentication response to the primary battery 102. The encrypted authentication response includes at least the first random number, the second random number, and the vehicle identifier associated with the fleet flag. The operations further include verifying, by the primary battery 102, upon decrypting the encrypted authentication response, the first random number and the vehicle identifier. The operations further include communicating, by the primary battery 102 via the CAN bus 114, the encrypted authentication message including at least the authentication status, the first random number, and the second random number to the vehicle controller 110. The operations further include verifying, by the vehicle controller 110, upon decrypting the encrypted authentication message, at least the first random number, the second random number, and the authentication status for authenticating at least the primary battery 102.

The disclosed embodiments encompass numerous advantages. Exemplary advantages of the disclosure include, but are not limited to, ensuring an uninterrupted authentication of one or more batteries (such as the primary battery 102 and/or the secondary batteries 104, 106, and 108) of the electric vehicle 112 at all times. The disclosed methods and systems facilitate a parallel offline authentication of the batteries. Therefore, an uninterrupted power supply is provided to the electric vehicle 112 even when the network connectivity is unavailable. The disclosed methods and systems allow for offline authentication of the batteries, including the primary battery 102 and the secondary batteries 104, 106, and 108, of the electric vehicle 112 with the vehicle controller 110 of the electric vehicle 112. Such verification of the batteries is performed via the CAN bus 114. The offline verification of the batteries eliminates requirement of the network connectivity and a server arrangement for authenticating the batteries before powering the electric vehicle 112. The verification of the batteries allows only authentic batteries to be used in the electric vehicle 112. Therefore, by virtue of the implementation of the disclosed methods and systems, misuse, illegal swapping, and theft of the batteries in the electric vehicle 112 may be prevented. Further, verification of the batteries is performed simultaneously that reduces time and processing required for the verification. The verification is based on the first and second random numbers generated by the primary battery 102 and the vehicle controller 110, respectively, and the vehicle identifier of the electric vehicle 112. Therefore, any sensitive information associated with the electric vehicle 112 and the individual or entity associated with the electric vehicle 112 do not get communicated to a random entity, thereby, preventing theft and misuse of such sensitive information. In addition, sniffing and replay attacks are also prevented as the first and second random numbers used in the authentication process are generated dynamically. Further, as the authentication process is a complete parallel mechanism, the time taken for executing these security checks will be very minimal (Max is 250 ms), so that there is no considerable waiting time once the electric engine of the electric vehicle 112 is ready to be powered by these batteries. Further, as the mechanism completely eliminates server intervention, there is no effect for this process irrespective of network making the operations exceptionally smooth.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for performing the offline authentication of the one or more batteries of the electric vehicle 112. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. An offline battery authentication method, wherein a controller area network (CAN) bus is used to enable vehicle components of an electric vehicle to communicate without being connected to an external network, the offline battery authentication method comprising:
    generating, by a primary battery of the electric vehicle, a first random number;
    communicating, by the primary battery via the CAN bus without using the external network, an encrypted authentication request to a plurality of secondary batteries and a vehicle controller of the electric vehicle, wherein
        the encrypted authentication request includes at least the first random number and a fleet flag;
    decrypting, by the plurality of secondary batteries and the vehicle controller, the encrypted authentication request to obtain at least the first random number and the fleet flag;
    generating, by the vehicle controller, a second random number based on the communication of the encrypted authentication request by the primary battery;
    communicating, by the vehicle controller via the CAN bus without using the external network, an encrypted authentication response to the primary battery and each secondary battery of the plurality of secondary batteries, wherein the encrypted authentication response includes at least the first random number, the second random number, and a vehicle identifier associated with the fleet flag;
    verifying, by the primary battery and each secondary battery of the plurality of secondary batteries, the first random number and the vehicle identifier of the encrypted authentication response;
    communicating, by each secondary battery of the plurality of secondary batteries via the CAN bus without using the external network, an encrypted battery status to the primary battery, wherein the encrypted battery status includes at least the first random number, the second random number, and an authentication status, wherein the authentication status is based on the verification of the first random number and the vehicle identifier by each secondary battery of the plurality of secondary batteries;
    verifying, by the primary battery, at least the first random number, the second random number, and the authentication status in the encrypted battery status;
    communicating, by the primary battery via the CAN bus without using the external network, an encrypted authentication message including at least the authentication status, the first random number, and the second random number to the plurality of secondary batteries and the vehicle controller; and
    verifying, by the plurality of secondary batteries and the vehicle controller, the first random number, the second random number, and the authentication status in the encrypted authentication message for authenticating each secondary battery of the plurality of secondary batteries.

2. The offline battery authentication method of claim 1, further comprising:
    communicating, by the vehicle controller via the CAN bus, an encrypted authentication message response to the primary battery and each secondary battery of the plurality of secondary batteries, wherein the encrypted authentication message response includes at least the first random number, the second random number, and a vehicle controller identifier;
    verifying, by the primary battery and each secondary battery of the plurality of secondary batteries, at least the first random number and the second random number of the encrypted authentication message response; and
    storing, by the primary battery and each secondary battery of the plurality of secondary batteries, the vehicle controller identifier based on the verification of the first random number and the second random number of the encrypted authentication message response.

3. The offline battery authentication method of claim 1, further comprising:
    storing, by each secondary battery of the plurality of secondary batteries and the vehicle controller, at least the first random number after the decryption of the encrypted authentication request; and
    generating, by the vehicle controller, the second random number before the communication of the encrypted authentication response.

4. The offline battery authentication method of claim 1, wherein
    the encrypted battery status of each secondary battery of the plurality of secondary batteries further includes a secondary battery identifier and
    the secondary battery identifier is a unique identification number that identifies a corresponding secondary battery of the plurality of secondary batteries in the electric vehicle.

5. The offline battery authentication method of claim 1, wherein
    the encrypted authentication request further includes a request identifier, and
    the request identifier is a unique identification number that identifies a corresponding authentication request communicated by the primary battery.

6. The offline battery authentication method of claim 1, wherein
the encrypted authentication message further includes a primary battery identifier of the primary battery, and
the primary battery identifier is a unique identification number that identifies the primary battery in the electric vehicle.

7. The offline battery authentication method of claim 1, further comprising determining the fleet flag based on a category of the electric vehicle, wherein the category of the electric vehicle is one of the electric vehicle associated with an individual, a fleet of electric vehicles associated with an entity, or a fleet of electric vehicles associated with the individual.

8. An offline battery authentication system, wherein a controller area network (CAN) bus is used to enable vehicle components of an electric vehicle to communicate without being connected to an external network, the offline battery authentication system comprising:
a primary battery of the electric vehicle,
a plurality of secondary batteries of the electric vehicle, and
a vehicle controller of the electric vehicle, wherein
the primary battery is configured to:
generate a first random number; and
communicate, via the CAN bus without using the external network, an encrypted authentication request to the plurality of secondary batteries and the vehicle controller, wherein
the encrypted authentication request includes at least the first random number and a fleet flag;
the plurality of secondary batteries and the vehicle controller are configured to decrypt the encrypted authentication request to obtain at least the first random number and the fleet flag;
the vehicle controller is further configured to:
receive the encrypted authentication request from the primary battery;
generate a second random number based on the received encrypted authentication request; and
communicate, via the CAN bus without using the external network, an encrypted authentication response to the primary battery and each secondary battery of the plurality of secondary batteries, wherein the encrypted authentication response includes at least the first random number, the second random number, and a vehicle identifier associated with the fleet flag,
the primary battery and each secondary battery of the plurality of secondary batteries are further configured to verify the first random number and the vehicle identifier of the encrypted authentication response,
each secondary battery of the plurality of secondary batteries is further configured to communicate, via the CAN bus without using the external network, an encrypted battery status to the primary battery,
the encrypted battery status includes at least the first random number, the second random number, and an authentication status,
the authentication status is based on the verification of the first random number and the vehicle identifier by each secondary battery of the plurality of secondary batteries,
the primary battery is further configured to:
verify at least the first random number, the second random number, and the authentication status in the encrypted battery status; and
communicate, via the CAN bus without using the external network, an encrypted authentication message that includes at least the authentication status, the first random number, and the second random number to the plurality of secondary batteries and the vehicle controller, and
the plurality of secondary batteries and the vehicle controller are further configured to verify at least the first random number, the second random number, and the authentication status in the encrypted authentication message to authenticate each secondary battery of the plurality of secondary batteries.

9. The offline battery authentication system of claim 8, wherein
the vehicle controller is further configured to communicate, via the CAN bus, an encrypted authentication message response to the primary battery and each secondary battery of the plurality of secondary batteries,
the encrypted authentication message response includes at least the first random number, the second random number, and a vehicle controller identifier, and
the primary battery and each secondary battery of the plurality of secondary batteries are further configured to:
receive, via the CAN bus, the encrypted authentication message response from the vehicle controller;
verify at least the first random number and the second random number of the received encrypted authentication message response; and
store the vehicle controller identifier based on the verification of at least the first random number and the second random number of the encrypted authentication message response.

10. The offline battery authentication system of claim 8, wherein
each secondary battery of the plurality of secondary batteries and the vehicle controller are further configured to store at least the first random number after the decryption of the encrypted authentication request, and
the vehicle controller is further configured to generate the second random number before the communication of the encrypted authentication response.

11. The offline battery authentication system of claim 8, wherein
the encrypted battery status of each secondary battery of the plurality of secondary batteries further includes a secondary battery identifier, and
the secondary battery identifier is a unique identification number that identifies a corresponding secondary battery of the plurality of secondary batteries in the electric vehicle.

12. The offline battery authentication system of claim 8, wherein
the encrypted authentication request further includes a request identifier, and
the request identifier is a unique identification number that identifies a corresponding authentication request communicated by the primary battery.

13. The offline battery authentication system of claim 8, wherein
the encrypted authentication message further includes a primary battery identifier of the primary battery, and the primary battery identifier is a unique identification number that identifies the primary battery in the electric vehicle.

14. The offline battery authentication system of claim 8, wherein
the fleet flag is based on a category of the electric vehicle, and
the category of the electric vehicle is one of the electric vehicle associated with an individual, a fleet of electric vehicles associated with an entity, a fleet of electric vehicles associated with the individual.

15. The offline battery authentication system of claim 8, wherein
the primary battery is different from the plurality of secondary batteries,
the plurality of secondary batteries and the vehicle controller are further configured to:
  decrypt the encrypted authentication request to obtain the first random number; and
  store the first random number based on the decryption of the encrypted authentication request, and the plurality of secondary batteries and the primary battery are configured to:
  receive, from the vehicle controller via the CAN bus without using the external network, the encrypted authentication response; and
  store the second random number included in the encrypted authentication response.

* * * * *